US012580421B2

(12) United States Patent
Hu et al.

(10) Patent No.: US 12,580,421 B2
(45) Date of Patent: Mar. 17, 2026

(54) RECTIFIER, INVERTER, AND WIRELESS CHARGING DEVICE

(71) Applicant: HUAWEI TECHNOLOGIES CO., LTD., Shenzhen (CN)

(72) Inventors: Zhangrong Hu, Shanghai (CN); Wei Wei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 878 days.

(21) Appl. No.: 17/748,885

(22) Filed: May 19, 2022

(65) Prior Publication Data

US 2022/0278558 A1 Sep. 1, 2022

Related U.S. Application Data

(63) Continuation of application No. PCT/CN2019/119991, filed on Nov. 21, 2019.

(51) Int. Cl.
*H02J 50/12* (2016.01)
*H01M 10/44* (2006.01)
(Continued)

(52) U.S. Cl.
CPC ............. *H02J 50/12* (2016.02); *H01M 10/44* (2013.01); *H02J 7/02* (2013.01);
(Continued)

(58) Field of Classification Search
CPC .......... H02J 50/12; H02J 7/02; H02J 2207/20; H01M 10/44; H02M 3/33573; H02M 3/33569; Y02B 70/10
(Continued)

(56) References Cited

U.S. PATENT DOCUMENTS 4,926,306 A 5/1990 Ueda et al.
5,940,280 A 8/1999 Murai et al.
(Continued)

FOREIGN PATENT DOCUMENTS

CN 103683987 A 3/2014
CN 106033931 A 10/2016
(Continued)

OTHER PUBLICATIONS

Yeon-Kug Moon, Hyung-Gu Park, Jae-Hyeong Jang, Suki Kim, Kang-Yoon Lee, "A high efficiency transmitter and receiver for magnetic resonant wireless battery charging system in 0.35 (micro)m BCD", Jan. 7, 2014, Analog Integrated Circuits and Signal Processing, vol. 79, No. 1, pp. 57-71. (Year: 2014).*
(Continued)

*Primary Examiner* — Julian D Huffman
*Assistant Examiner* — Nathan J Instone
(74) *Attorney, Agent, or Firm* — Rimon PC

(57) ABSTRACT

This application provides a rectifier, an inverter, and a wireless charging device. The rectifier includes a signal conversion unit and a switchable capacitor unit that are mutually coupled. The switchable capacitor unit is configured to switch a rectification mode of the rectifier. The rectification mode may include but is not limited to any one of the following: a voltage multiplier rectification mode or a full-bridge rectification mode. Therefore, a variable dynamic range of an output voltage of the rectifier provided in embodiments of this application is large.

20 Claims, 19 Drawing Sheets

(51) Int. Cl.
  *H02J 7/02*        (2016.01)
  *H02M 3/335*       (2006.01)

(52) U.S. Cl.
  CPC ..... *H02M 3/33573* (2021.05); *H02J 2207/20*
      (2020.01); *H02M 3/33569* (2013.01); *Y02B*
                            *70/10* (2013.01)

(58) Field of Classification Search
  USPC ........................................................ 320/108
  See application file for complete search history.

(56)              References Cited

U.S. PATENT DOCUMENTS

2014/0119060 A1*   5/2014   Zhu ................... H02M 3/33573
                                                        363/17
2016/0294221 A1   10/2016   Maniktala
2017/0373537 A1   12/2017   Dayal et al.
2019/0326813 A1*  10/2019   Li ....................... H02M 1/4241

FOREIGN PATENT DOCUMENTS

| CN | 107147199 | A  | 9/2017  |
|----|-----------|----|---------|
| DE | 102016207929 | A1 | 11/2017 |
| EP | 0354535   | A2 | 2/1990  |
| JP | 2001145360 | A  | 5/2001  |
| JP | 2008099512 | A  | 4/2008  |
| WO | 2018169520 | A1 | 9/2018  |

OTHER PUBLICATIONS

Moon Yeon-Kug et al: "A high efficiency transmitter and receiver formagnetic resonant wireless battery charging system in 0.35 [mu]m",Analog Integrated Circuits and Signal Processing, Springer New York LLC, US, vol. 79, No. 1, Jan. 7, 2014 (Jan. 7, 2014), pp. 57-72, XP035311692,ISSN: 0925-1030, DOI: 10.1007/S10470-013-0253-1 [retrieved on Jan. 7, 2014].

* cited by examiner

RECTIFIER, INVERTER, AND WIRELESS CHARGING DEVICE

CROSS-REFERENCE TO RELATED APPLICATIONS

This application is a continuation of International Application No. PCT/CN2019/119991, filed on Nov. 21, 2019, which is hereby incorporated by reference in its entirety.

TECHNICAL FIELD

This application relates to the field of wireless charging technologies, and in particular, to a rectifier, an inverter, and a wireless charging device.

BACKGROUND

With the development of wireless charging technologies, the wireless charging technologies are increasingly applied to different electronic products. The wireless charging technology is a technology in which electric energy is transmitted between a charger and a power consumption device by using a magnetic field, and user equipment can be charged without connecting the charger and the power consumption device using a wire.

In a related technology, a wireless charging receiver generally includes a resonant circuit and a rectifier circuit. The resonant circuit is configured to convert an electromagnetic signal obtained from a wireless charging transmitter. The rectifier circuit is configured to rectify a signal output by the resonant circuit. In addition, the rectifier circuit runs in a full-bridge rectification mode, that is, an output voltage of an output port of the rectifier circuit is approximately equal to an input voltage of an input port of the rectifier circuit.

Similarly, the wireless charging transmitter generally includes a resonant circuit and an inverter circuit. The resonant circuit is configured to convert, into an electromagnetic signal, a signal output by the inverter circuit. The inverter circuit is configured to perform inversion processing on an input signal, so that the resonant circuit transmits the electromagnetic signal. In addition, the inverter circuit runs in a full-bridge inversion mode, that is, an output voltage of an output port of the inverter circuit is approximately equal to an input voltage of an input port of the inverter circuit.

It may be learned that, in the related technology, an output voltage of the rectifier circuit in the wireless charging receiver or the inverter circuit in the wireless charging transmitter is approximately equal to an input voltage of the rectifier circuit in the wireless charging receiver or the inverter circuit in the wireless charging transmitter, and has a small variable dynamic range.

SUMMARY

This application provides a rectifier, an inverter, and a wireless charging device, to resolve a technical problem, in a related technology, that a variable dynamic range of an output voltage of a rectifier circuit in a wireless charging receiver or an inverter circuit in a wireless charging transmitter is small.

According to a first aspect, an embodiment of this application provides a rectifier, including a signal conversion unit and a switchable capacitor unit. The signal conversion unit includes a first port, a second port, a third port, a fourth port, a first unidirectional conduction semiconductor transistor, a second unidirectional conduction semiconductor transistor, a third unidirectional conduction semiconductor transistor, and a fourth unidirectional conduction semiconductor transistor. An output port of the first unidirectional conduction semiconductor transistor and an input port of the second unidirectional conduction semiconductor transistor are coupled to the first port. An output port of the second unidirectional conduction semiconductor transistor and an output port of the third unidirectional conduction semiconductor transistor are coupled to the second port. An output port of the fourth unidirectional conduction semiconductor transistor and an input port of the third unidirectional conduction semiconductor transistor are coupled to the third port. An input port of the first unidirectional conduction semiconductor transistor and an input port of the fourth unidirectional conduction semiconductor transistor are coupled to the fourth port. The first port and the third port are configured to be coupled to a resonant circuit. The fourth port is configured to be coupled to a constant voltage. The switchable capacitor unit is coupled to at least one of the first port and the third port, the second port, and the fourth port. The first port and the third port are input ports of the rectifier. The second port and the fourth port are output ports of the rectifier. The constant voltage may be a ground voltage.

The switchable capacitor unit in this embodiment of this application is configured to switch a rectification mode of the rectifier. The rectification mode may include but is not limited to a voltage multiplier rectification mode and a full-bridge rectification mode.

For example, the first unidirectional conduction semiconductor transistor, the second unidirectional conduction semiconductor transistor, the third unidirectional conduction semiconductor transistor, and the fourth unidirectional conduction semiconductor transistor may all be diodes. Correspondingly, an input port of each diode may be an anode of the diode, and an output port of each diode may be a cathode of the diode.

For another example, the first unidirectional conduction semiconductor transistor, the second unidirectional conduction semiconductor transistor, the third unidirectional conduction semiconductor transistor, and the fourth unidirectional conduction semiconductor transistor may all be metal-oxide semiconductor MOS transistors. A connection direction of each MOS transistor needs to meet the following: An anode of a body diode of the MOS transistor is used as an input port of the MOS transistor, and a cathode of the body diode of the MOS transistor is used as an output port of the MOS transistor. For example, if any unidirectional conduction semiconductor transistor is a PMOS transistor, an input port of the unidirectional conduction semiconductor transistor is a drain of the PMOS transistor, and an output port of the unidirectional conduction semiconductor transistor is a source of the PMOS transistor. Alternatively, if any unidirectional conduction semiconductor transistor is an NMOS transistor, an input port of the unidirectional conduction semiconductor transistor is a source of the NMOS transistor, and an output port of the unidirectional conduction semiconductor transistor is a drain of the NMOS transistor.

In an example, the first unidirectional conduction semiconductor transistor, the second unidirectional conduction semiconductor transistor, the third unidirectional conduction semiconductor transistor, and the fourth unidirectional conduction semiconductor transistor may all be PMOS transistors or NMOS transistors.

In another example, some unidirectional conduction semiconductor transistors in the first unidirectional conduction semiconductor transistor, the second unidirectional conduction semiconductor transistor, the third unidirectional conduction semiconductor transistor, and the fourth unidirectional conduction semiconductor transistor may be PMOS transistors, and some other unidirectional conduction semiconductor transistors may be NMOS transistors. It should be noted that a connection manner in this example needs to meet the following connection rule: (1) When the PMOS transistor is coupled to the NMOS transistor, a source of the PMOS transistor is coupled to a source of the NMOS transistor, or a drain of the PMOS transistor is coupled to a drain of the NMOS transistor. (2) A port configured to be coupled to the second port is the source of the PMOS transistor or the drain of the NMOS transistor.

For another example, some unidirectional conduction semiconductor transistors in the first unidirectional conduction semiconductor transistor, the second unidirectional conduction semiconductor transistor, the third unidirectional conduction semiconductor transistor, and the fourth unidirectional conduction semiconductor transistor may be diodes, and some other unidirectional conduction semiconductor transistors may be MOS transistors. An input port of each diode may be an anode of the diode, and an output port of each diode may be a cathode of the diode. A connection direction of each MOS transistor needs to meet the following: An anode of a body diode of the MOS transistor is used as an input port of the MOS transistor, and a cathode of the body diode of the MOS transistor is used as an output port of the MOS transistor. For example, if any unidirectional conduction semiconductor transistor is a PMOS transistor, an input port of the unidirectional conduction semiconductor transistor is a drain of the PMOS transistor, and an output port of the unidirectional conduction semiconductor transistor is a source of the PMOS transistor. Alternatively, if any unidirectional conduction semiconductor transistor is an NMOS transistor, an input port of the unidirectional conduction semiconductor transistor is a source of the NMOS transistor, and an output port of the unidirectional conduction semiconductor transistor is a drain of the NMOS transistor.

In addition, a gate of each MOS transistor may be used as a control pin to receive a control signal to control the MOS transistor to be turned on or turned off, so as to control a current to pass the output port of the MOS transistor.

The rectifier provided in this embodiment of this application includes the signal conversion unit and the switchable capacitor unit that are mutually coupled. The switchable capacitor unit is configured to switch the rectification mode of the rectifier. Therefore, a variable dynamic range of an output voltage of the rectifier provided in this embodiment of this application is large.

In a possible implementation, the switchable capacitor unit includes a first switch and a capacitor unit, the first switch is coupled between the third port and an internal node, and the capacitor unit is coupled to the second port, the fourth port, and the internal node.

In a possible implementation, the capacitor unit includes a first capacitor and a second capacitor, the first capacitor is coupled between the internal node and the second port, and the second capacitor is coupled between the internal node and the fourth port.

In a possible implementation, the capacitor unit further includes a third capacitor, and the third capacitor is coupled between the second port and the fourth port.

In a possible implementation, the capacitor unit includes a first capacitor and a second capacitor, the first capacitor is coupled between the internal node and a preset position, and the second capacitor is coupled between the second port and the fourth port. For example, the preset position includes any one of the following: the second port, the fourth port, or a preset voltage source (hereafter "preset voltage").

In a possible implementation, the switchable capacitor unit includes a first switch, a first capacitor, and a second capacitor, the first capacitor is coupled between the third port and an internal node, the first switch is coupled between the internal node and a preset position, and the second capacitor is coupled between the second port and the fourth port. For example, the preset position includes any one of the following: the second port, the fourth port, or a preset voltage.

In a possible implementation, the switchable capacitor unit further includes a first switching unit and a second switching unit, the first switching unit is coupled between the internal node and the first port, and the second switching unit is coupled between the fourth port and the resonant circuit.

In this implementation, the rectification mode of the rectifier may be switched by turning on or turning off the first switching unit and the second switching unit in cooperation with turning on or turning off the first switch.

In a possible implementation, the first switching unit includes a fifth unidirectional conduction semiconductor transistor and a second switch. The second switch is coupled between the internal node and an input port of the fifth unidirectional conduction semiconductor transistor, and an output port of the fifth unidirectional conduction semiconductor transistor is coupled to the first port. Alternatively, an input port of the fifth unidirectional conduction semiconductor transistor is coupled to the internal node, and the second switch is coupled between the first port and an output port of the fifth unidirectional conduction semiconductor transistor.

For example, the second switch may be a mechanical switch or a MOS transistor, and/or the fifth unidirectional conduction semiconductor transistor may be a diode or a MOS transistor. The MOS transistor may be a PMOS transistor or an NMOS transistor.

In a possible implementation, the second switching unit includes a sixth unidirectional conduction semiconductor transistor and a third switch. The third switch is coupled between the fourth port and an input port of the sixth unidirectional conduction semiconductor transistor, and an output port of the sixth unidirectional conduction semiconductor transistor is coupled to the resonant circuit. Alternatively, an input port of the sixth unidirectional conduction semiconductor transistor is coupled to the fourth port, and the third switch is coupled between an output port of the sixth unidirectional conduction semiconductor transistor and the resonant circuit.

For example, the third switch may be a mechanical switch or a MOS transistor, and/or the sixth unidirectional conduction semiconductor transistor may be a diode or a MOS transistor. The MOS transistor may be a PMOS transistor or an NMOS transistor.

In an example, if the first switch is turned on, and both the first switching unit and the second switching unit are turned off, the rectifier is in an n1 voltage multiplier rectification mode, where n1 is a real number greater than 0.

In another example, if the first switch, the second switch in the first switching unit, and the third switch in the second switching unit are turned on, the rectifier is in an n2 voltage multiplier rectification mode, where n2 is a real number greater than 0, and n2 is greater than n1.

In another example, if the first switch, the first switching unit, and the second switching unit are all turned off, the rectifier is in the full-bridge rectification mode.

According to the rectifier provided in this embodiment, more rectification modes of the rectifier may be switched by turning on or turning off the first switching unit and the second switching unit in cooperation with turning on or turning off the first switch. It may be learned that the variable dynamic range of the output voltage of the rectifier provided in this embodiment of this application is further increased.

In a possible implementation, the rectifier further includes an assisted boost circuit, and the assisted boost circuit is coupled between the first port and the second port, and is configured to perform voltage boost on a voltage of the first port, so that a voltage obtained after voltage boost meets a startup voltage of a controller, and the controller can control the switchable capacitor unit to switch the rectification mode of the rectifier.

According to a second aspect, an embodiment of this application provides a wireless charging device, where the device is configured to receive a wireless charging signal, and the device includes the rectifier according to any one of the implementations of the first aspect and a resonant circuit.

In a possible implementation, the device further includes a controller, configured to control a switchable capacitor unit to switch a rectification mode of the rectifier. The rectification mode includes a voltage multiplier rectification mode or a full-bridge rectification mode. The voltage multiplier rectification mode includes an n1 voltage multiplier rectification mode or an n2 voltage multiplier rectification mode.

It should be understood that the controller is further configured to control each unidirectional conduction semiconductor transistor in the signal conversion unit to be turned on or turned off.

According to the device provided in this implementation, the rectification mode of the rectifier is switched, so that an output voltage of the device can be adjusted, to meet a power supply requirement.

In a possible implementation, the device further includes a charging management unit that is coupled between a second port and a fourth port and that is configured to perform voltage conversion on an output voltage of an output port of the rectifier, to match a storage voltage of an electric energy storage unit.

According to a third aspect, an embodiment of this application provides an inverter, including a signal conversion unit and a switchable capacitor unit. The signal conversion unit includes a first port, a second port, a third port, a fourth port, a first unidirectional conduction semiconductor transistor, a second unidirectional conduction semiconductor transistor, a third unidirectional conduction semiconductor transistor, and a fourth unidirectional conduction semiconductor transistor. An input port of the first unidirectional conduction semiconductor transistor and an output port of the second unidirectional conduction semiconductor transistor are coupled to the first port. An input port of the second unidirectional conduction semiconductor transistor and an input port of the third unidirectional conduction semiconductor transistor are coupled to the second port. An input port of the fourth unidirectional conduction semiconductor transistor and an output port of the third unidirectional conduction semiconductor transistor are coupled to the third port. An output port of the first unidirectional conduction semiconductor transistor and an output port of the fourth unidirectional conduction semiconductor transistor are coupled to the fourth port. The first port and the third port are configured to be coupled to a resonant circuit. The fourth port is configured to be coupled to a constant voltage. The switchable capacitor unit is coupled to at least one of the first port and the third port, the second port, and the fourth port. The first port and the third port are output ports of the inverter. The second port and the fourth port are input ports of the inverter. The constant voltage may be a ground voltage.

The switchable capacitor unit in this embodiment of this application is configured to switch an inversion mode of the inverter. The inversion mode may include but is not limited to a voltage division inversion mode and a full-bridge inversion mode.

For example, the first unidirectional conduction semiconductor transistor, the second unidirectional conduction semiconductor transistor, the third unidirectional conduction semiconductor transistor, and the fourth unidirectional conduction semiconductor transistor may all be metal-oxide semiconductor MOS transistors. A connection direction of each MOS transistor needs to meet the following: A cathode of a body diode of the MOS transistor is used as an input port of the MOS transistor, and an anode of the body diode of the MOS transistor is used as an output port of the MOS transistor. For example, if any unidirectional conduction semiconductor transistor is a PMOS transistor, an input port of the unidirectional conduction semiconductor transistor is a source of the PMOS transistor, and an output port of the unidirectional conduction semiconductor transistor is a drain of the PMOS transistor. Alternatively, if any unidirectional conduction semiconductor transistor is an NMOS transistor, an input port of the unidirectional conduction semiconductor transistor is a drain of the NMOS transistor, and an output port of the unidirectional conduction semiconductor transistor is a source of the NMOS transistor.

In an example, the first unidirectional conduction semiconductor transistor, the second unidirectional conduction semiconductor transistor, the third unidirectional conduction semiconductor transistor, and the fourth unidirectional conduction semiconductor transistor may all be PMOS transistors or NMOS transistors.

In another example, some unidirectional conduction semiconductor transistors in the first unidirectional conduction semiconductor transistor, the second unidirectional conduction semiconductor transistor, the third unidirectional conduction semiconductor transistor, and the fourth unidirectional conduction semiconductor transistor may be PMOS transistors, and some other unidirectional conduction semiconductor transistors may be NMOS transistors. It should be noted that a connection manner in this example needs to meet the following connection rule: (1) When the PMOS transistor is coupled to the NMOS transistor, a source of the PMOS transistor is coupled to a source of the NMOS transistor, or a drain of the PMOS transistor is coupled to a drain of the NMOS transistor. (2) A port configured to be coupled to the second port is the source of the PMOS transistor or the drain of the NMOS transistor.

In addition, a gate of each MOS transistor may be used as a control pin to receive a control signal to control the MOS transistor to be turned on or turned off, so as to control a current to pass the output port of the MOS transistor.

The inverter provided in this embodiment of this application includes the signal conversion unit and the switchable capacitor unit that are mutually coupled. The switchable capacitor unit is configured to switch the inversion mode of the inverter. Therefore, a variable dynamic range of an output voltage of the inverter provided in this embodiment of this application is large.

In a possible implementation, the switchable capacitor unit includes a first switch and a capacitor unit, the first switch is coupled between the third port and an internal node, and the capacitor unit is coupled to the second port, the fourth port, and the internal node.

In a possible implementation, the capacitor unit includes a first capacitor and a second capacitor, the first capacitor is coupled between the internal node and the second port, and the second capacitor is coupled between the internal node and the fourth port.

In a possible implementation, the capacitor unit further includes a third capacitor, and the third capacitor is coupled between the second port and the fourth port.

In a possible implementation, the capacitor unit includes a first capacitor and a second capacitor, the first capacitor is coupled between the internal node and a preset position, and the second capacitor is coupled between the second port and the fourth port. For example, the preset position includes any one of the following: the second port, the fourth port, or a preset voltage.

In a possible implementation, the switchable capacitor unit includes a first switch, a first capacitor, and a second capacitor, the first capacitor is coupled between the third port and an internal node, the first switch is coupled between the internal node and a preset position, and the second capacitor is coupled between the second port and the fourth port. For example, the preset position includes any one of the following: the second port, the fourth port, or a preset voltage.

In a possible implementation, the switchable capacitor unit further includes a first switching unit and a second switching unit, the first switching unit is coupled between the internal node and the first port, and the second switching unit is coupled between the fourth port and the resonant circuit.

In this implementation, the inversion mode of the inverter may be switched by turning on or turning off the first switching unit and the second switching unit in cooperation with turning on or turning off the first switch.

In a possible implementation, the first switching unit includes a fifth unidirectional conduction semiconductor transistor and a second switch. The second switch is coupled between the internal node and an input port of the fifth unidirectional conduction semiconductor transistor, and an output port of the fifth unidirectional conduction semiconductor transistor is coupled to the first port. Alternatively, an input port of the fifth unidirectional conduction semiconductor transistor is coupled to the internal node, and the second switch is coupled between the first port and an output port of the fifth unidirectional conduction semiconductor transistor.

For example, the second switch may be a mechanical switch or a MOS transistor, and/or the fifth unidirectional conduction semiconductor transistor may be a diode or a MOS transistor. The MOS transistor may be a PMOS transistor or an NMOS transistor.

In a possible implementation, the second switching unit includes a sixth unidirectional conduction semiconductor transistor and a third switch. The third switch is coupled between the fourth port and an input port of the sixth unidirectional conduction semiconductor transistor, and an output port of the sixth unidirectional conduction semiconductor transistor is coupled to the resonant circuit. Alternatively, an input port of the sixth unidirectional conduction semiconductor transistor is coupled to the fourth port, and the third switch is coupled between an output port of the sixth unidirectional conduction semiconductor transistor and the resonant circuit.

For example, the third switch may be a mechanical switch or a MOS transistor, and/or the sixth unidirectional conduction semiconductor transistor may be a diode or a MOS transistor. The MOS transistor may be a PMOS transistor or an NMOS transistor.

In an example, if the first switch is turned on, and both the first switching unit and the second switching unit are turned off, the inverter is in a $1/n1$ voltage division inversion mode, where $n1$ is a real number greater than 0.

In another example, if the first switch, the second switch in the first switching unit, and the third switch in the second switching unit are turned on, the inverter is in a $1/n2$ voltage division inversion mode, where $n2$ is a real number greater than 0, and $n2$ is greater than $n1$.

In another example, if the first switch, the first switching unit, and the second switching unit are all turned off, the inverter is in the full-bridge inversion mode.

According to the inverter provided in this embodiment, more inversion modes of the inverter may be switched by turning on or turning off the first switching unit and the second switching unit in cooperation with turning on or turning off the first switch. It may be learned that the variable dynamic range of the output voltage of the inverter provided in this embodiment of this application is further increased.

According to a fourth aspect, an embodiment of this application provides a wireless charging device, where the device is configured to send a wireless charging signal, and the device includes the inverter according to any one of the implementations of the third aspect and a resonant circuit.

In a possible implementation, the device further includes a controller, configured to control a switchable capacitor unit to switch an inversion mode of the inverter. The inversion mode includes a voltage division inversion mode or a full-bridge inversion mode. The voltage division inversion mode includes a $1/n1$ voltage division inversion mode or a $1/n2$ voltage division inversion mode.

It should be understood that the controller is further configured to control each unidirectional conduction semiconductor transistor in the signal conversion unit to be turned on or turned off.

According to the device provided in this implementation, the inversion mode of the inverter is switched, so that an output voltage of the device can be adjusted, to meet a required voltage coupled to a receive coil of a receive end.

DESCRIPTION OF EMBODIMENTS

Figure 1:
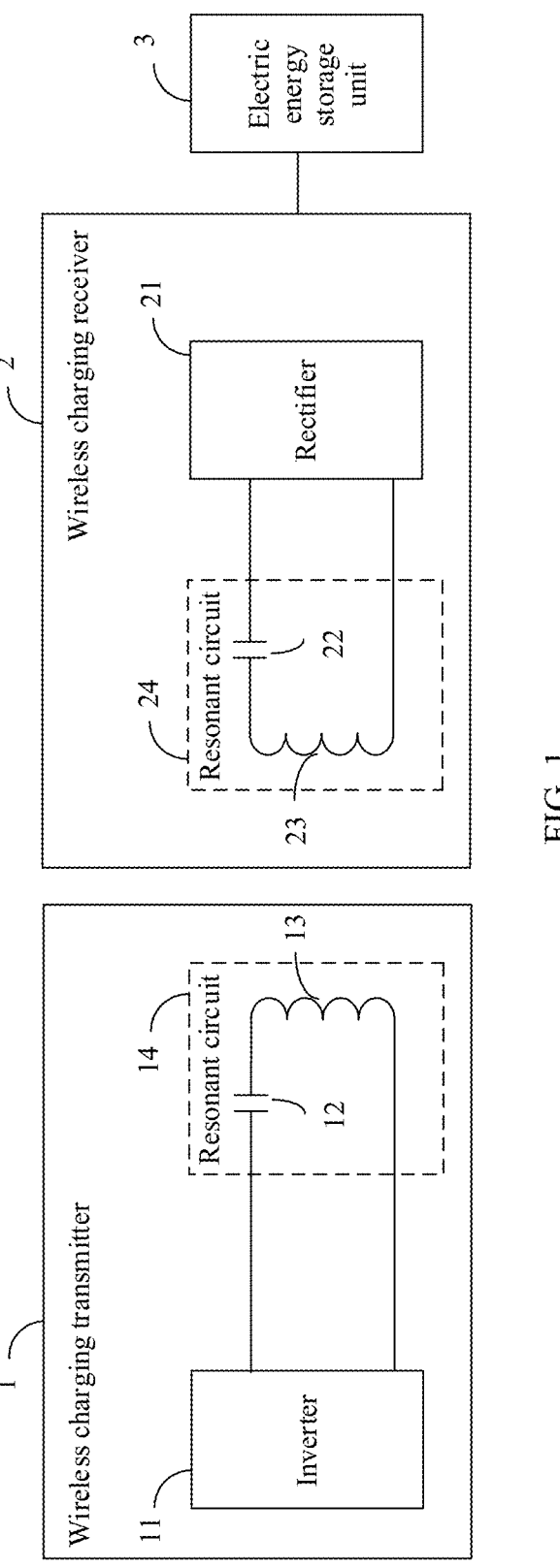
FIG. 1 is a schematic diagram of a system architecture according to an embodiment of this application.

First, a system architecture and some terms in embodiments of this application are described. FIG. 1 is a schematic diagram of a system architecture according to an embodiment of this application. As shown in FIG. 1, the system architecture provided in this embodiment of this application may include but is not limited to a wireless charging transmitter 1, a wireless charging receiver 2, and an electric energy storage unit 3. The wireless charging transmitter 1 may include but is not limited to an inverter 11 and a resonant circuit 14 that includes a resonant capacitor 12 and a transmit coil 13. An output port of the inverter 11 is coupled to two ports of the resonant circuit 14. The foregoing inverter 11 is configured to perform inversion processing on an input electrical signal. The resonant circuit 14 is configured to: convert, into an electromagnetic signal, the electrical signal obtained after the inverter 11 performs inversion processing, and transmit the electromagnetic signal. Implementations of the inverter 11 and the wireless charging transmitter 1 are described in the following embodiments of this application. The wireless charging transmitter 1 may adjust an output voltage of the wireless charging transmitter 1 by switching an inversion mode of the inverter 11, to meet a required voltage coupled to a receive coil of a receive end.

The wireless charging receiver 2 may include but is not limited to a rectifier 21 and a resonant circuit 24 that includes a resonant capacitor 22 and a receive coil 23. An input port of the rectifier 21 is coupled to an output port of the resonant circuit 24, and an output port of the rectifier 21 is coupled to the electric energy storage unit 3. The resonant circuit 24 is configured to convert, into an electrical signal, the electromagnetic signal received from the transmit coil 13. The rectifier 21 is configured to: perform rectification processing on the electrical signal output by the resonant circuit 24, and store, into the electric energy storage unit 3, electric energy obtained through processing. Implementations of the rectifier 21 and the wireless charging receiver 2 are described in the following embodiments of this application. The wireless charging receiver 2 may adjust an output voltage of the wireless charging receiver 2 by switching a rectification mode of the rectifier 21, to meet a power supply requirement.

Numbers in the embodiments of this application, such as "first" and "second", are used to distinguish between similar objects, but are not necessarily used to describe a specific sequence or chronological order, and should not constitute any limitation on the embodiments of this application. Coupling in the embodiments of this application means an electrical connection, including a direct connection or an indirect connection. This is not limited in this application. A unidirectional conduction semiconductor transistor in the embodiments of this application may be a metal-oxide semiconductor field-effect transistor (MOSFET) (or briefly referred to as a MOS transistor) or a diode. Certainly, the unidirectional conduction semiconductor transistor may be another semiconductor transistor that has a unidirectional conduction function. This is not limited in the embodiments of this application. Any MOS transistor in the embodiments of this application does not include only one MOS transistor. For example, in engineering application, a plurality of MOS transistors may be connected in parallel to implement a low on-resistance, or a plurality of MOS transistors may be connected in series to implement a high withstand voltage. This is not limited in the embodiments of this application. Any diode in the embodiments of this application does not include only one diode. For example, in engineering application, a plurality of diodes may be connected in parallel to implement a low on-resistance, or a plurality of diodes may be connected in series to implement a high withstand voltage. This is not limited in the embodiments of this application.

For example, if any unidirectional conduction semiconductor transistor is a diode, correspondingly, an input port of the diode may be an anode of the diode, and an output port of the diode may be a cathode of the diode. Any switch in the embodiments of this application may be a MOS transistor or a mechanical switch. Certainly, the switch may be another component that has a switch function. This is not limited in the embodiments of this application. For example, the MOS transistor in the embodiments of this application may include a PMOS transistor or an NMOS transistor. An electronic device in the embodiments of this application may include but is not limited to a terminal device such as a mobile phone, a tablet computer, or a notebook computer. A wireless charging transmitter in the embodiments of this application may include but is not limited to a device that externally transmits a power, for example, a charging pad. A wireless charging receiver in the embodiments of this application may include but is not limited to a device that can receive a wireless charging power, for example, an electronic device with a battery, a medical device, or an electric vehicle. A wireless charging device in the embodiments of this application may include but is not limited to a wireless charging transmitter or a wireless charging receiver.

A related technology has a technical problem that an output voltage of a rectifier circuit in a wireless charging receiver or an inverter circuit in a wireless charging transmitter is approximately equal to an input voltage of the rectifier circuit in the wireless charging receiver or the inverter circuit in the wireless charging transmitter. According to a rectifier, an inverter, and a wireless charging device that are provided in the embodiments of this application, the rectifier or the inverter includes a signal conversion unit and a switchable capacitor unit that are coupled to each other. The switchable capacitor unit in the rectifier is configured to switch a rectification mode of the rectifier, or the switchable capacitor unit in the inverter is configured to switch an inversion mode of the inverter. Therefore, a variable dynamic range of an output voltage of the rectifier or the inverter provided in the embodiments of this application is large.

Figure 2A:
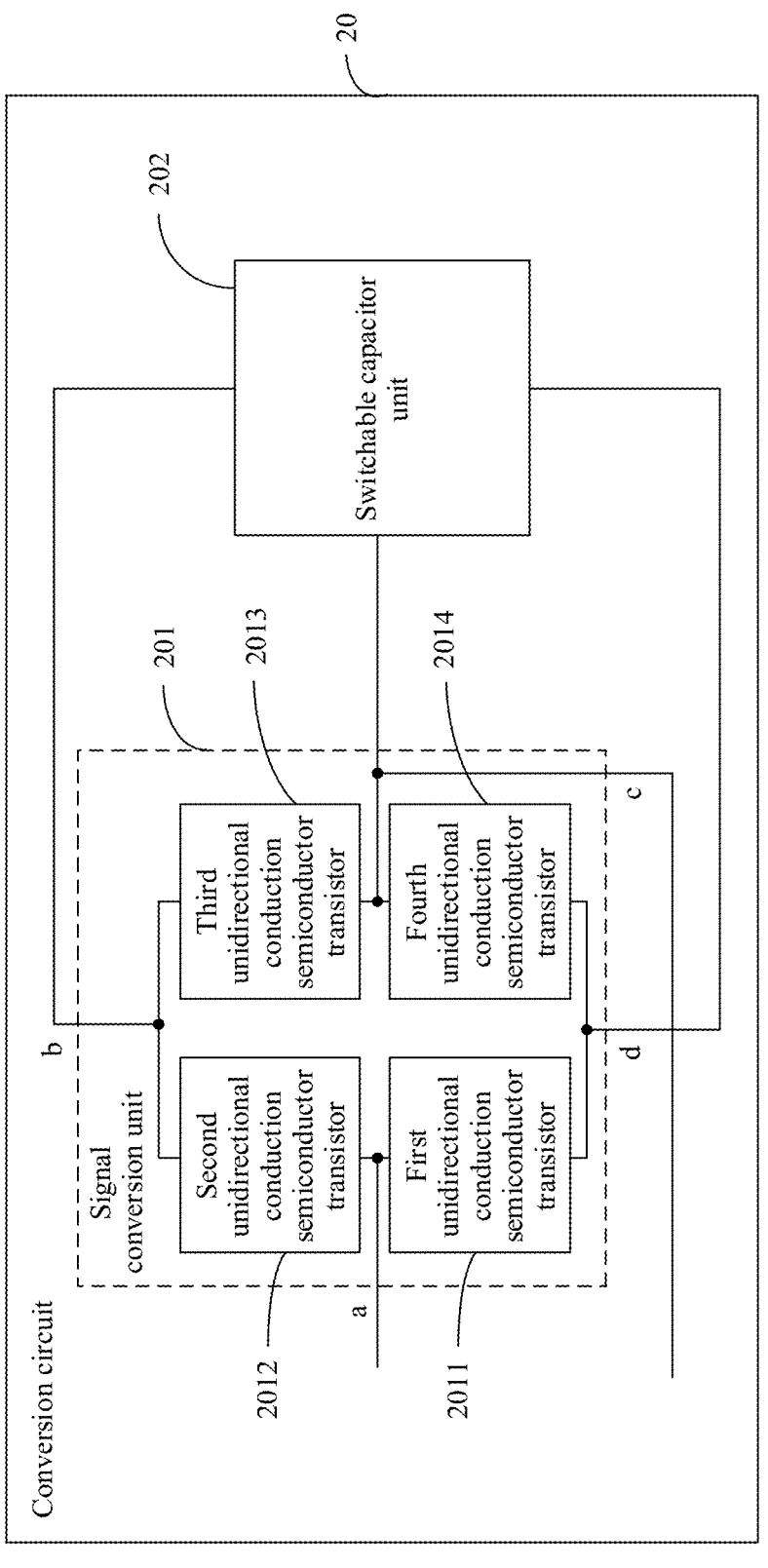
FIG. 2A is a schematic diagram of a structure of a conversion circuit according to an embodiment of this application.

Specific embodiments are used below to describe in detail the technical solutions of this application. The following several specific embodiments may be combined with each other, and a same or similar concept or process may not be described repeatedly in some embodiments. FIG. 2A is a schematic diagram of a structure of a conversion circuit according to an embodiment of this application.

As shown in FIG. 2A, a conversion circuit 20 provided in this embodiment of this application may include a signal conversion unit 201 and a switchable capacitor unit 202. Optionally, the conversion circuit 20 provided in this embodiment of this application may be a rectifier or an inverter. The signal conversion unit 201 may include but is not limited to: a first port a, a second port b, a third port c, a fourth port d, a first unidirectional conduction semiconductor transistor 2011, a second unidirectional conduction semiconductor transistor 2012, a third unidirectional conduction semiconductor transistor 2013, and a fourth unidirectional conduction semiconductor transistor 2014.

In an example, if the conversion circuit 20 provided in this embodiment of this application is a rectifier, a connection relationship of the signal conversion unit 201 may be as follows: An output port of the first unidirectional conduction semiconductor transistor 2011 and an input port of the second unidirectional conduction semiconductor transistor 2012 are coupled to the first port a. An output port of the second unidirectional conduction semiconductor transistor 2012 and an output port of the third unidirectional conduction semiconductor transistor 2013 are coupled to the second port b. An output port of the fourth unidirectional conduction semiconductor transistor 2014 and an input port of the third unidirectional conduction semiconductor transistor 2013 are coupled to the third port c. An input port of the first unidirectional conduction semiconductor transistor 2011 and an input port of the fourth unidirectional conduction semiconductor transistor 2014 are coupled to the fourth port d. The fourth port d is configured to be coupled to a constant voltage. For example, the constant voltage may be a ground voltage. The first port a and the third port c are input ports of the rectifier, and are configured to be coupled to an output port of a resonant circuit 24. The second port b and the fourth port d are output ports of the rectifier, and are configured to be coupled to an electric energy storage unit 3.

For example, the first unidirectional conduction semiconductor transistor 2011, the second unidirectional conduction semiconductor transistor 2012, the third unidirectional conduction semiconductor transistor 2013, and the fourth unidirectional conduction semiconductor transistor 2014 may all be diodes. Correspondingly, an input port of each diode may be an anode of the diode, an output port of each diode may be a cathode of the diode.

Figure 2B:
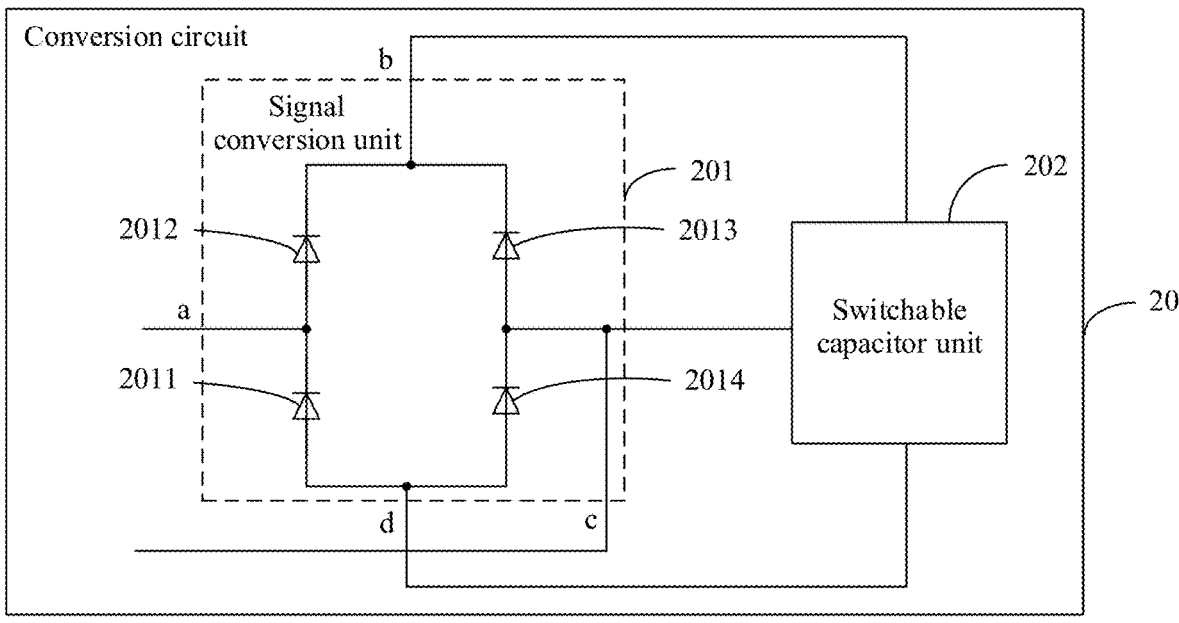
FIG. 2B is a schematic diagram of a structure of a conversion circuit according to an embodiment of this application.

FIG. 2B is a schematic diagram of a structure of a conversion circuit according to an embodiment of this application. As shown in FIG. 2B, the first unidirectional conduction semiconductor transistor 2011, the second unidirectional conduction semiconductor transistor 2012, the third unidirectional conduction semiconductor transistor 2013, and the fourth unidirectional conduction semiconductor transistor 2014 in this embodiment of this application may all be diodes.

For another example, the first unidirectional conduction semiconductor transistor 2011, the second unidirectional conduction semiconductor transistor 2012, the third unidirectional conduction semiconductor transistor 2013, and the fourth unidirectional conduction semiconductor transistor 2014 may all be metal-oxide semiconductor MOS transistors. A connection direction of each MOS transistor needs to meet the following: An anode of a body diode of the MOS transistor is used as an input port of the MOS transistor, and a cathode of the body diode of the MOS transistor is used as an output port of the MOS transistor. For example, if any unidirectional conduction semiconductor transistor is a PMOS transistor, an input port of the unidirectional conduction semiconductor transistor is a drain of the PMOS transistor, and an output port of the unidirectional conduction semiconductor transistor is a source of the PMOS transistor. Alternatively, if any unidirectional conduction semiconductor transistor is an NMOS transistor, an input port of the unidirectional conduction semiconductor transistor is a source of the NMOS transistor, and an output port of the unidirectional conduction semiconductor transistor is a drain of the NMOS transistor.

In a possible implementation, the first unidirectional conduction semiconductor transistor 2011, the second unidirectional conduction semiconductor transistor 2012, the third unidirectional conduction semiconductor transistor 2013, and the fourth unidirectional conduction semiconductor transistor 2014 may all be PMOS transistors or NMOS transistors.

Figure 2C:
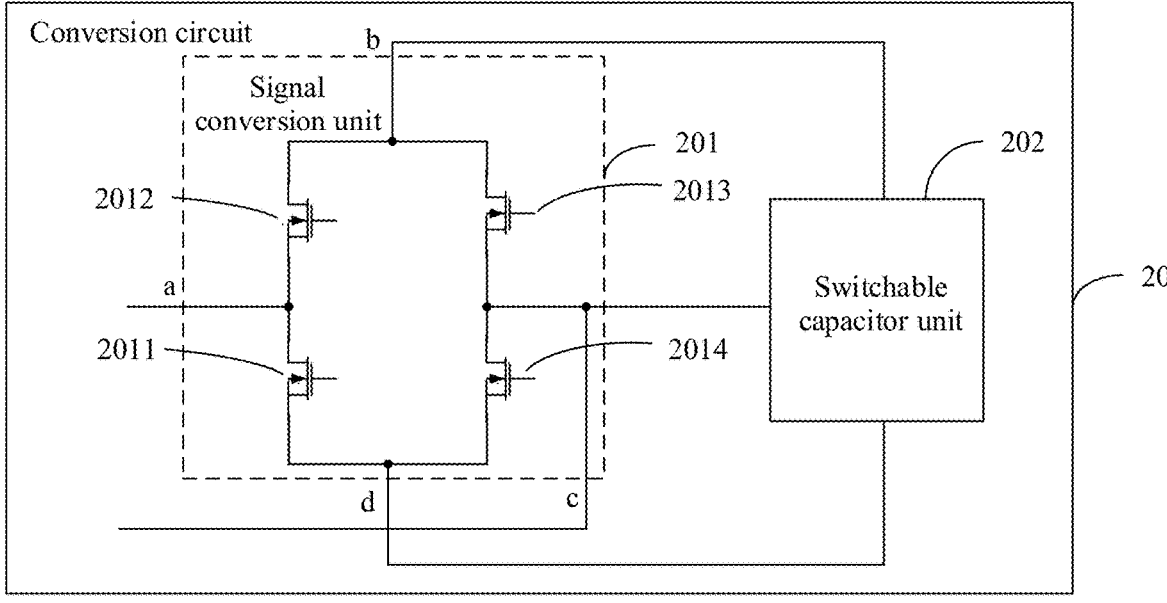
FIG. 2C is a schematic diagram of a structure of a conversion circuit according to an embodiment of this application.

FIG. 2C is a schematic diagram of a structure of a conversion circuit according to an embodiment of this application. As shown in FIG. 2C, the first unidirectional conduction semiconductor transistor 2011, the second unidirectional conduction semiconductor transistor 2012, the third unidirectional conduction semiconductor transistor 2013, and the fourth unidirectional conduction semiconductor transistor 2014 in this embodiment of this application may all be NMOS transistors. Correspondingly, an input port of each NMOS transistor may be a source of the NMOS transistor, an output port of each NMOS transistor may be a drain of the NMOS transistor.

In another possible implementation, some unidirectional conduction semiconductor transistors in the first unidirectional conduction semiconductor transistor 2011, the second unidirectional conduction semiconductor transistor 2012, the third unidirectional conduction semiconductor transistor 2013, and the fourth unidirectional conduction semiconductor transistor 2014 may be PMOS transistors, and some other unidirectional conduction semiconductor transistors may be NMOS transistors. It should be noted that a connection manner in this implementation needs to meet the following connection rule: (1) When the PMOS transistor is coupled to the NMOS transistor, a source of the PMOS transistor is coupled to a source of the NMOS transistor, or a drain of the PMOS transistor is coupled to a drain of the NMOS transistor. (2) A port configured to be coupled to the second port is the source of the PMOS transistor or the drain of the NMOS transistor.

For another example, some unidirectional conduction semiconductor transistors in the first unidirectional conduction semiconductor transistor 2011, the second unidirectional conduction semiconductor transistor 2012, the third unidirectional conduction semiconductor transistor 2013, and the fourth unidirectional conduction semiconductor transistor 2014 may be diodes, and some other unidirectional conduction semiconductor transistors may be MOS transistors. An input port of each diode may be an anode of the diode, and an output port of each diode may be a cathode of the diode. A connection direction of each MOS transistor needs to meet the following: An anode of a body diode of the MOS transistor is used as an input port of the MOS transistor, and a cathode of the body diode of the MOS transistor is used as an output port of the MOS transistor. For example, if any unidirectional conduction semiconductor transistor is a PMOS transistor, an input port of the unidirectional conduction semiconductor transistor is a drain of the PMOS transistor, and an output port of the unidirectional conduction semiconductor transistor is a source of the PMOS transistor. Alternatively, if any unidirectional conduction semiconductor transistor is an NMOS transistor, an input port of the unidirectional conduction semiconductor transistor is a source of the NMOS transistor, and an output port of the unidirectional conduction semiconductor transistor is a drain of the NMOS transistor.

For example, a gate of each MOS transistor in this embodiment of this application may be used as a control pin to receive a control signal to control the MOS transistor to be turned on or turned off. For example, the NMOS transistor 2012 is used as an example. When an input voltage of the input port of the NMOS transistor 2012 is higher than an output voltage of the NMOS transistor 2012, the control signal received by the gate of the NMOS transistor 2012 is used to control the NMOS transistor to be turned on, so that a current flows from the input port a of the NMOS transistor 2012 to the output port b. When an output voltage of the output port of the NMOS transistor 2012 is higher than an input voltage of the NMOS transistor 2012, the control signal is used to control the NMOS transistor to be turned off, to prevent a current from reversely flowing from the output port b of the NMOS transistor 2012 to the input port a.

For example, the switchable capacitor unit 202 may be coupled to at least one of the first port a and the third port c, the second port b, and the fourth port d. It should be noted that for ease of drawing, the accompanying drawings in embodiments of this application are shown by using an example in which the switchable capacitor unit 202 is coupled to the third port c, the second port b, and the fourth port d. A person skilled in the art should understand that the switchable capacitor unit 202 may alternatively be coupled to the first port a, the second port b, and the fourth port d.

The switchable capacitor unit 202 in this embodiment of this application is configured to switch a rectification mode of the conversion circuit 20 (namely, the rectifier). The rectification mode may include but is not limited to a voltage multiplier rectification mode and a full-bridge rectification mode. In a possible implementation, when the conversion circuit 20 is in the voltage multiplier rectification mode, an output voltage of an output port of the conversion circuit 20 may be n times an input voltage of an input port of the conversion circuit 20, where n is a real number greater than 0. For example, when n=n1, correspondingly, the conversion circuit 20 is in an n1 voltage multiplier rectification mode. Alternatively, when n=n2, correspondingly, the conversion circuit 20 is in an n2 voltage multiplier rectification mode, where n2 is greater than n1.

In another possible implementation, when the conversion circuit 20 is in the full-bridge rectification mode, a difference between an output voltage of an output port of the conversion circuit 20 and an input voltage of an input port of the conversion circuit 20 may be equal to on-voltage drops of two unidirectional conduction semiconductor transistors in the signal conversion unit 201. Because the on-voltage drop of the unidirectional conduction semiconductor transistor is small, in this mode, it may be considered that the output voltage of the output port of the conversion circuit 20 is equal to the input voltage of the input port of the conversion circuit 20.

In conclusion, the rectifier provided in embodiments of this application includes the signal conversion unit 201 and the switchable capacitor unit 202 that are mutually coupled. The switchable capacitor unit 202 is configured to switch the rectification mode of the rectifier. Therefore, a variable dynamic range of the output voltage of the rectifier provided in embodiments of this application is large.

In another example, if the conversion circuit 20 provided in this embodiment of this application is an inverter, a connection relationship of the signal conversion unit 201 may be as follows: An input port of the first unidirectional conduction semiconductor transistor 2011 and an output port of the second unidirectional conduction semiconductor transistor 2012 are coupled to the first port a. An input port of the second unidirectional conduction semiconductor transistor 2012 and an input port of the third unidirectional conduction semiconductor transistor 2013 are coupled to the second port b. An input port of the fourth unidirectional conduction semiconductor transistor 2014 and an output port of the third unidirectional conduction semiconductor transistor 2013 are coupled to the third port c. An output port of the first unidirectional conduction semiconductor transistor 2011 and an output port of the fourth unidirectional conduction semiconductor transistor 2014 are coupled to the fourth port d. The fourth port d is configured to be coupled to a constant voltage. For example, the constant voltage may be a ground voltage. The second port b and the fourth port d are input ports of the inverter. The first port a and the third port c are output ports of the inverter, and are configured to be coupled to two ports of the resonant circuit 14.

For example, the first unidirectional conduction semiconductor transistor 2011, the second unidirectional conduction semiconductor transistor 2012, the third unidirectional conduction semiconductor transistor 2013, and the fourth unidirectional conduction semiconductor transistor 2014 may all be metal-oxide semiconductor MOS transistors. A connection direction of each MOS transistor needs to meet the following: A cathode of a body diode of the MOS transistor is used as an input port of the MOS transistor, and an anode of the body diode of the MOS transistor is used as an output port of the MOS transistor. For example, if any unidirectional conduction semiconductor transistor is a PMOS transistor, an input port of the unidirectional conduction semiconductor transistor is a source of the PMOS transistor, and an output port of the unidirectional conduction semiconductor transistor is a drain of the PMOS transistor. Alternatively, if any unidirectional conduction semiconductor transistor is an NMOS transistor, an input port of the unidirectional conduction semiconductor transistor is a drain of the NMOS transistor, and an output port of the unidirectional conduction semiconductor transistor is a source of the NMOS transistor.

In a possible implementation, the first unidirectional conduction semiconductor transistor 2011, the second unidirectional conduction semiconductor transistor 2012, the third unidirectional conduction semiconductor transistor 2013, and the fourth unidirectional conduction semiconductor transistor 2014 may all be PMOS transistors or NMOS transistors as shown in FIG. 2C. Correspondingly, an input port of each NMOS transistor may be a drain of the NMOS transistor, an output port of each NMOS transistor may be a source of the NMOS transistor.

In another example, some unidirectional conduction semiconductor transistors in the first unidirectional conduction semiconductor transistor 2011, the second unidirectional conduction semiconductor transistor 2012, the third unidirectional conduction semiconductor transistor 2013, and the fourth unidirectional conduction semiconductor transistor 2014 may be PMOS transistors, and some other unidirectional conduction semiconductor transistors may be NMOS transistors. It should be noted that a connection manner in this example needs to meet the following connection rule: (1) When the PMOS transistor is coupled to the NMOS transistor, a source of the PMOS transistor is coupled to a source of the NMOS transistor, or a drain of the PMOS transistor is coupled to a drain of the NMOS transistor. (2) A port configured to be coupled to the second port is the source of the PMOS transistor or the drain of the NMOS transistor.

For example, a gate of each MOS transistor in this embodiment of this application may be used as a control pin to receive a control signal to control the MOS transistor to be turned on or turned off, so as to control a current to pass the output port of the MOS transistor. For example, when the control signal received by the gate of the MOS transistor is to control the MOS transistor to be turned off, a current may be prevented from flowing through the MOS transistor. This implements unidirectional conduction.

For example, the NMOS transistor 2012 is used as an example. When an input voltage of the input port of the NMOS transistor 2012 is higher than an output voltage of the NMOS transistor 2012, the control signal received by the gate of the NMOS transistor 2012 is used to control the NMOS transistor to be turned on, so that a current flows from the input port b of the NMOS transistor 2012 to the output port a. When an output voltage of the output port of the NMOS transistor 2012 is higher than an input voltage of the NMOS transistor 2012, the control signal is used to control the NMOS transistor to be turned off, to prevent a current from reversely flowing from the output port a of the NMOS transistor 2012 to the input port b.

For example, the switchable capacitor unit 202 may be coupled to at least one of the first port a and the third port c, the second port b, and the fourth port d. It should be noted that for ease of drawing, the accompanying drawings in embodiments of this application are shown by using an example in which the switchable capacitor unit 202 is coupled to the third port c, the second port b, and the fourth port d. A person skilled in the art should understand that the switchable capacitor unit 202 may alternatively be coupled to the first port a, the second port b, and the fourth port d.

The switchable capacitor unit 202 in this embodiment of this application is configured to switch an inversion mode of the conversion circuit 20 (namely, the inverter). The inversion mode may include but is not limited to a voltage division inversion mode and a full-bridge inversion mode. In a possible implementation, when the conversion circuit 20 is in the voltage division inversion mode, an output voltage of an output port of the conversion circuit 20 may be 1/n times an input voltage of an input port of the conversion circuit 20. For example, when n=n1, correspondingly, the conversion circuit 20 is in a 1/n1 voltage division inversion mode. Alternatively, when n=n2, correspondingly, the conversion circuit 20 is in a 1/n2 voltage division inversion mode.

In another implementation, when the conversion circuit 20 is in the full-bridge inversion mode, a difference between an output voltage of an output port of the conversion circuit 20 and an input voltage of an input port of the conversion circuit 20 may be equal to on-voltage drops of two unidirectional conduction semiconductor transistors in the signal conversion unit 201. Because the on-voltage drop of the unidirectional conduction semiconductor transistor is small, in this mode, it may be considered that the output voltage of the output port of the conversion circuit 20 is equal to the input voltage of the input port of the conversion circuit 20.

In conclusion, the inverter provided in embodiments of this application includes the signal conversion unit 201 and the switchable capacitor unit 202 that are mutually coupled. The switchable capacitor unit 202 is configured to switch the inversion mode of the inverter. Therefore, a variable dynamic range of the output voltage of the inverter provided in embodiments of this application is large.

Figure 3A:
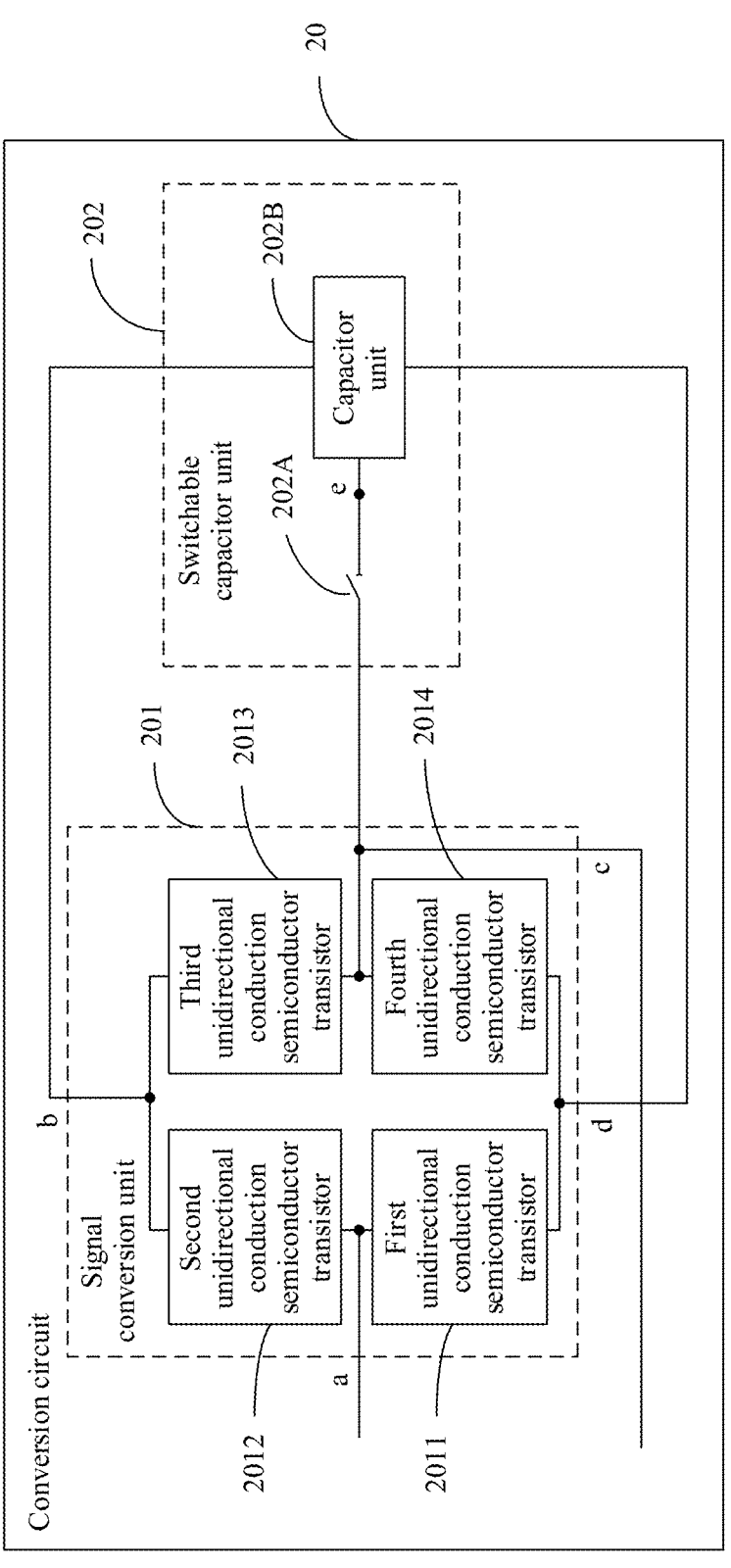
FIG. 3A is a schematic diagram of a structure of a conversion circuit according to an embodiment of this application.

Based on the foregoing embodiments, the following embodiments of this application describe implementations of the switchable capacitor unit 202 in the conversion circuit 20. FIG. 3A is a schematic diagram of a structure of a conversion circuit according to an embodiment of this application. Based on any one of the foregoing embodiments shown in FIG. 2A to FIG. 2C, a possible implementation of the switchable capacitor unit 202 is described in this embodiment of this application. As shown in FIG. 3A, the switchable capacitor unit 202 may include but is not limited to a first switch 202A and a capacitor unit 202B. The first switch 202A is coupled between the third port c and an internal node e, and the capacitor unit 202B is coupled to the second port b, the fourth port d, and the internal node e.

In this embodiment of this application, a conversion mode of the conversion circuit 20 may be switched by turning on or turning off the first switch 202A. For example, if the conversion circuit 20 is a rectifier and the first switch 202A is turned on, the conversion circuit 20 is in the voltage multiplier rectification mode; or if the first switch 202A is turned off, the conversion circuit 20 is in the full-bridge rectification mode. For another example, if the conversion circuit 20 is an inverter and the first switch 202A is turned on, the conversion circuit 20 is in the voltage division inversion mode; or if the first switch 202A is turned off, the conversion circuit 20 is in the full-bridge inversion mode. The first switch 202A in this embodiment of this application may be a mechanical switch or a MOS transistor. The MOS transistor may be a PMOS transistor or an NMOS transistor.

Figure 3B:
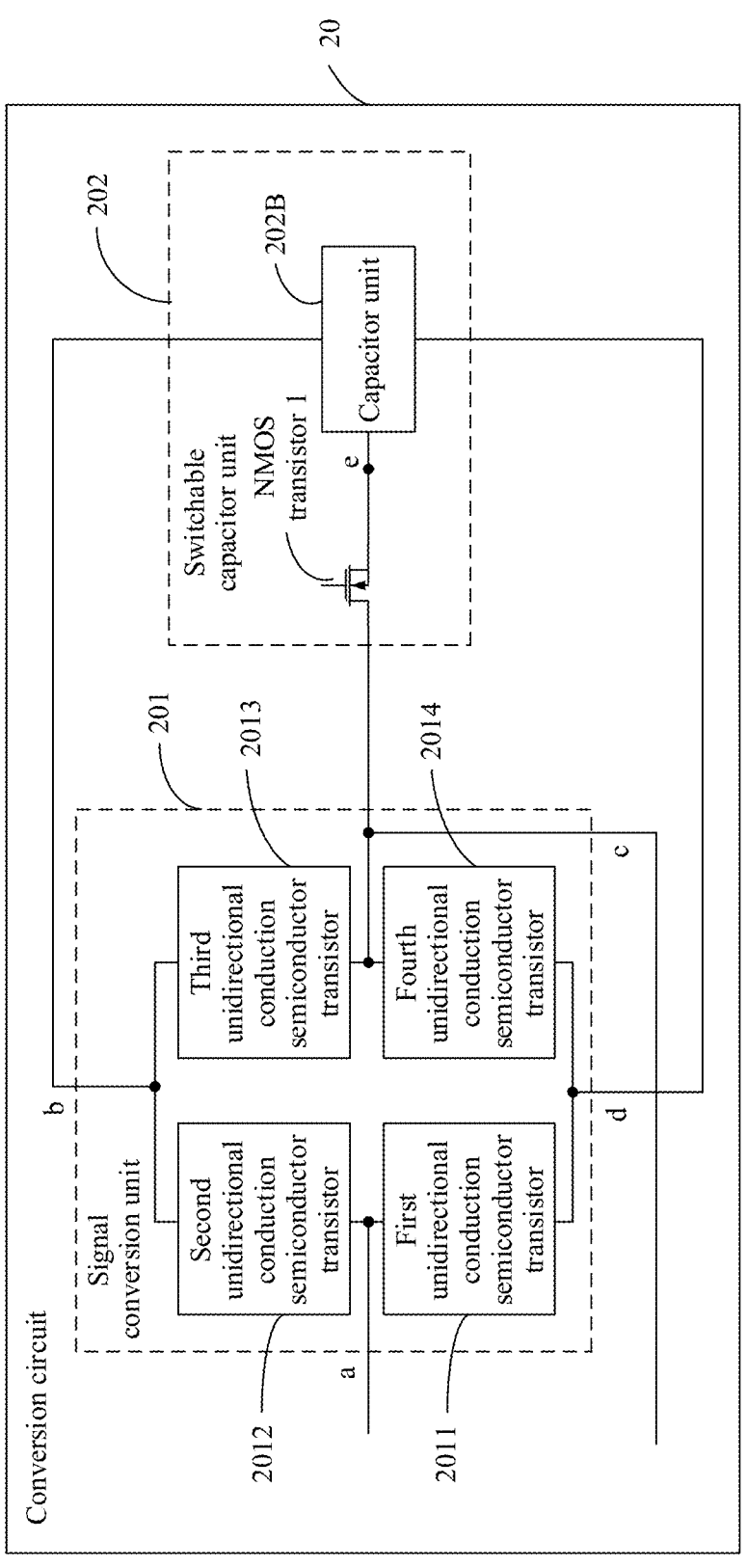
FIG. 3B is a schematic diagram of a structure of a conversion circuit according to an embodiment of this application.

FIG. 3B is a schematic diagram of a structure of a conversion circuit according to an embodiment of this application. As shown in FIG. 3B, based on the embodiment shown in FIG. 3A, when the first switch 202A is an NMOS transistor 1, a source s of the NMOS transistor 1 may be coupled to the third port c, and a drain d of the NMOS transistor 1 is coupled to the internal node e. It should be noted that a gate g of the NMOS transistor 1 is configured to receive a control signal to control the NMOS transistor 1 to be turned on or turned off. It should be understood that the source s of the NMOS transistor 1 may be coupled to the internal node e, and the drain d of the NMOS transistor 1 is coupled to the third port c (this manner is not shown in the figure).

In addition, based on the embodiment shown in FIG. 3A, when the first switch 202A is a PMOS transistor 1, a source s of the PMOS transistor 1 may be coupled to the third port c, and a drain d of the PMOS transistor 1 is coupled to the internal node e. It should be noted that a gate g of the PMOS transistor 1 is configured to receive a control signal to control the PMOS transistor 1 to be turned on or turned off. It should be understood that the source s of the PMOS transistor 1 may be coupled to the internal node e, and the drain d of the PMOS transistor 1 is coupled to the third port c (this manner is not shown in the figure).

Figure 3C:
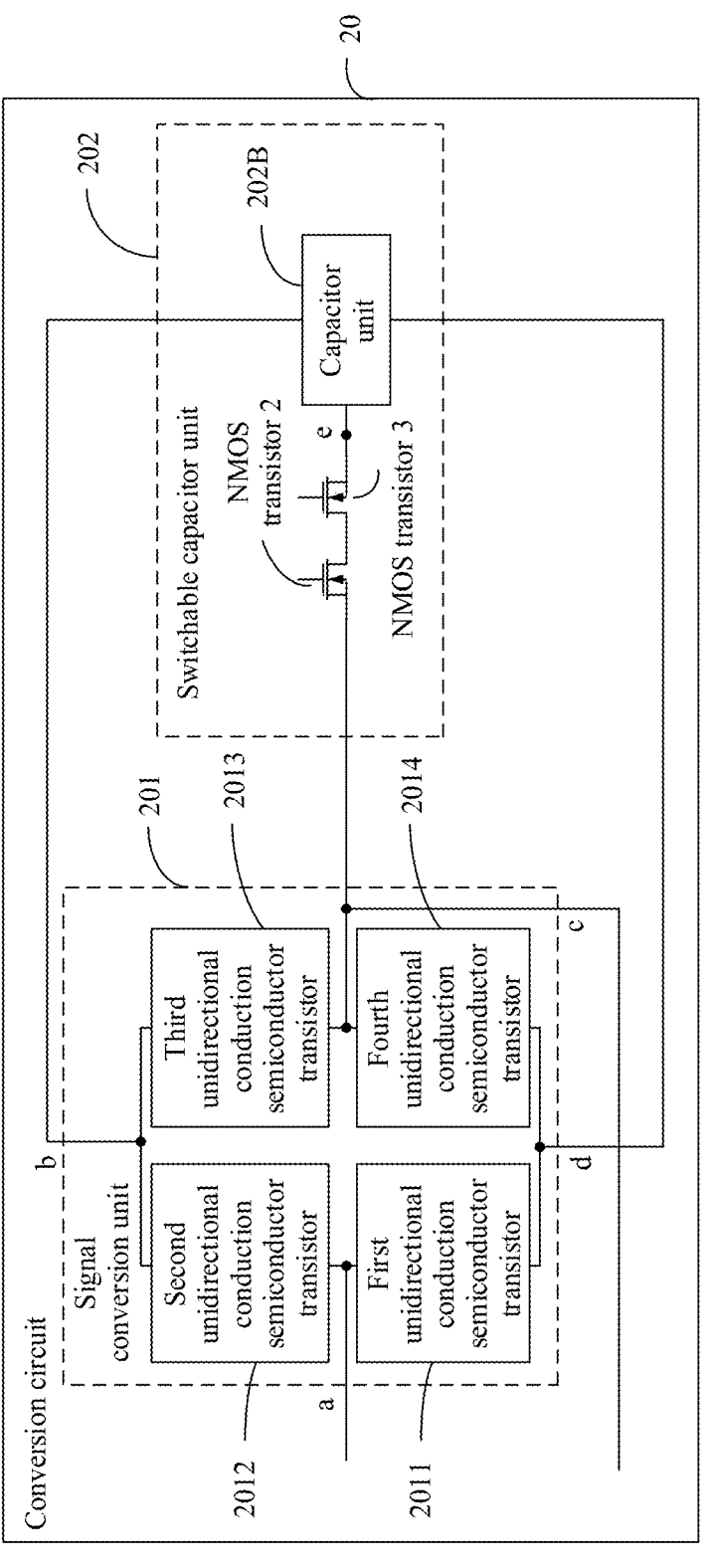
FIG. 3C is a schematic diagram of a structure of a conversion circuit according to an embodiment of this application.

FIG. 3C is a schematic diagram of a structure of a conversion circuit according to an embodiment of this application. As shown in FIG. 3C, based on the embodiment shown in FIG. 3A, when the first switch 202A includes an NMOS transistor 2 and an NMOS transistor 3, a source s of the NMOS transistor 2 may be coupled to the third port c, a drain d of the NMOS transistor 2 is coupled to a drain d of the NMOS transistor 3, and a source s of the NMOS transistor 3 is coupled to the internal node e. It should be understood that the drain d of the NMOS transistor 2 may be coupled to the third port c, the source s of the NMOS transistor 2 is coupled to the source s of the NMOS transistor 3, and the drain d of the NMOS transistor 3 is coupled to the internal node e (this manner is not shown in the figure).

It should be noted that gates g of the NMOS transistor 2 and the NMOS transistor 3 are configured to receive a control signal to control a corresponding NMOS transistor to be turned on or turned off. Generally, the NMOS transistor 2 and the NMOS transistor 3 are simultaneously turned on or turned off under control of the control signal, so that bidirectional anti-backflow can be implemented. It should be understood that the NMOS transistor 2 and the NMOS transistor 3 that are configured to implement bidirectional anti-backflow may be replaced with one MOS transistor.

In addition, the first switch 202A may include a PMOS transistor 2 and a PMOS transistor 3. A source s of the PMOS transistor 2 may be coupled to the third port c, a drain d of the PMOS transistor 2 is coupled to a drain d of the PMOS transistor 3, and a source s of the PMOS transistor 3 is coupled to the internal node e (this manner is not shown in the figure). It should be understood that the drain d of the PMOS transistor 2 may be coupled to the third port c, the source s of the PMOS transistor 2 is coupled to the source s of the PMOS transistor 3, and the drain d of the PMOS transistor 3 is coupled to the internal node e (this manner is not shown in the figure).

In addition, the first switch 202A may include one PMOS transistor and one NMOS transistor. A drain of the PMOS transistor may be coupled to the third port c, a source of the PMOS transistor is coupled to a drain of the NMOS transistor, and a source of the NMOS transistor may be coupled to the internal node e (this manner is not shown in the figure). Alternatively, a source of the PMOS transistor may be coupled to the third port c, a drain of the PMOS transistor is coupled to a source of the NMOS transistor, and a drain of the NMOS transistor may be coupled to the internal node e (this manner is not shown in the figure). Certainly, the first switch 202A may be another component that has a switch function. This is not limited in this embodiment of this application.

Figure 3D:
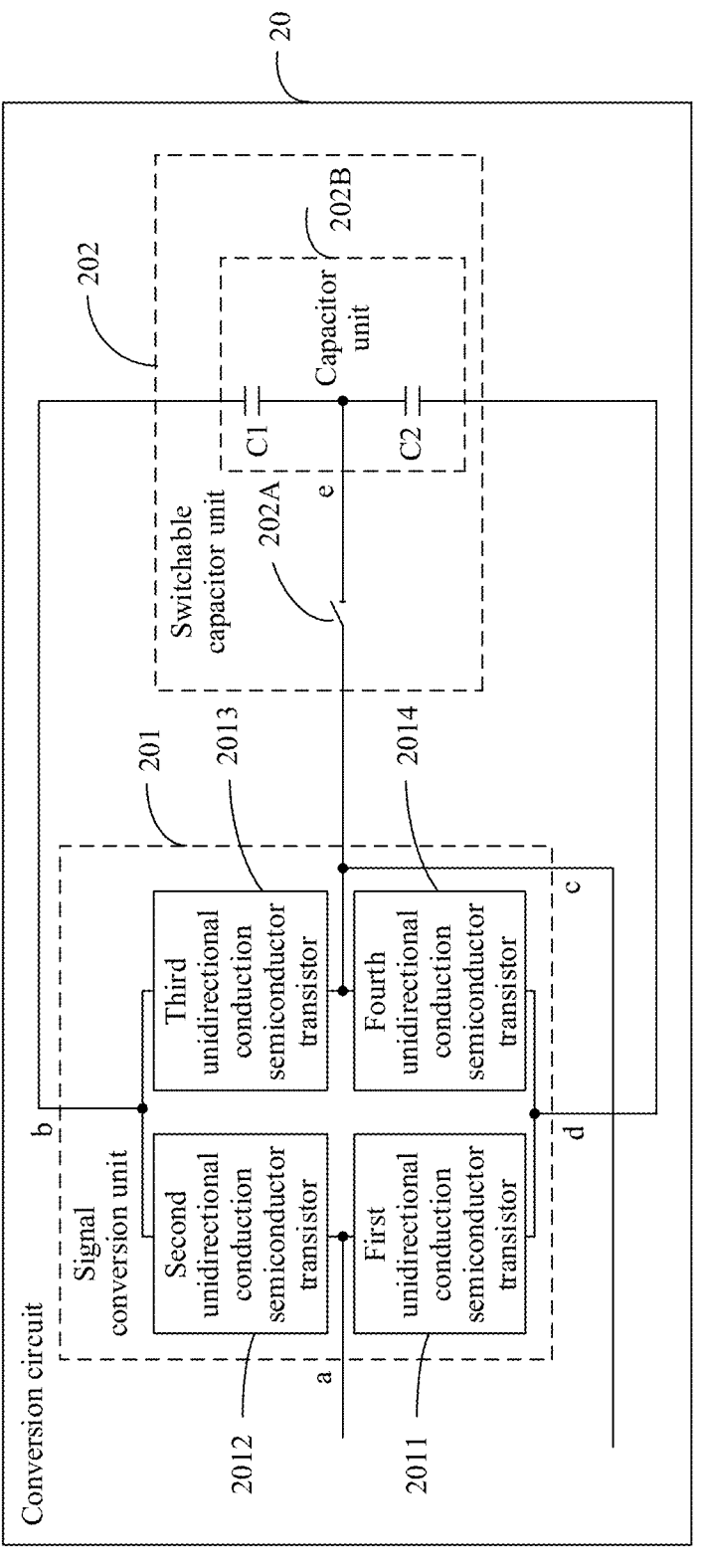
FIG. 3D is a schematic diagram of a structure of a conversion circuit according to an embodiment of this application.

Based on the foregoing embodiments, an implementation of the capacitor unit 202B in the switchable capacitor unit 202 is described in the following embodiments of this application. For example, based on the embodiment shown in FIG. 3A, a possible implementation of the capacitor unit 202B is described in this embodiment of this application. FIG. 3D is a schematic diagram of a structure of a conversion circuit according to an embodiment of this application. As shown in FIG. 3D, the capacitor unit 202B may include but is not limited to a first capacitor C1 and a second capacitor C2. The first capacitor C1 may be coupled between the internal node e and the second port b, and the second capacitor C2 is coupled between the internal node e and the fourth port d.

For example, if the conversion circuit 20 is a rectifier and the first switch 202A is turned on, the first unidirectional conduction semiconductor transistor 2011 and the second unidirectional conduction semiconductor transistor 2012 in the signal conversion unit 201 and the capacitor unit 202B are located in a voltage multiplier rectifier circuit. Alternatively, if the first switch 202A is turned off, the first unidirectional conduction semiconductor transistor 2011, the second unidirectional conduction semiconductor transistor 2012, the third unidirectional conduction semiconductor transistor 2013, and the fourth unidirectional conduction semiconductor transistor 2014 in the signal conversion unit 201 and the capacitor unit 202B are located in a full-bridge rectifier circuit.

It should be understood that, if the first unidirectional conduction semiconductor transistor 2011, the second unidirectional conduction semiconductor transistor 2012, and the capacitor unit 202B are located in the voltage multiplier rectifier circuit, the conversion circuit 20 is in the voltage multiplier rectification mode. Alternatively, if the first unidirectional conduction semiconductor transistor 2011, the second unidirectional conduction semiconductor transistor 2012, the third unidirectional conduction semiconductor transistor 2013, the fourth unidirectional conduction semiconductor transistor 2014, and the capacitor unit 202B are located in the full-bridge rectifier circuit, the conversion circuit 20 is in the full-bridge rectification mode.

For another example, if the conversion circuit 20 is an inverter and the first switch 202A is turned on, the first unidirectional conduction semiconductor transistor 2011 and the second unidirectional conduction semiconductor transistor 2012 in the signal conversion unit 201 and the capacitor unit 202B are located in a voltage division inverter circuit. Alternatively, if the first switch 202A is turned off, the first unidirectional conduction semiconductor transistor 2011, the second unidirectional conduction semiconductor transistor 2012, the third unidirectional conduction semiconductor transistor 2013, and the fourth unidirectional conduction semiconductor transistor 2014 in the signal conversion unit 201 and the capacitor unit 202B are located in a full-bridge inverter circuit.

It should be understood that, if the first unidirectional conduction semiconductor transistor 2011, the second unidirectional conduction semiconductor transistor 2012, and the capacitor unit 202B are located in the voltage division inverter circuit, the conversion circuit 20 is in the voltage division inversion mode. Alternatively, if the first unidirectional conduction semiconductor transistor 2011, the second unidirectional conduction semiconductor transistor 2012, the third unidirectional conduction semiconductor transistor 2013, the fourth unidirectional conduction semiconductor transistor 2014, and the capacitor unit 202B are located in the full-bridge inverter circuit, the conversion circuit 20 is in the full-bridge inversion mode.

Figure 3E:
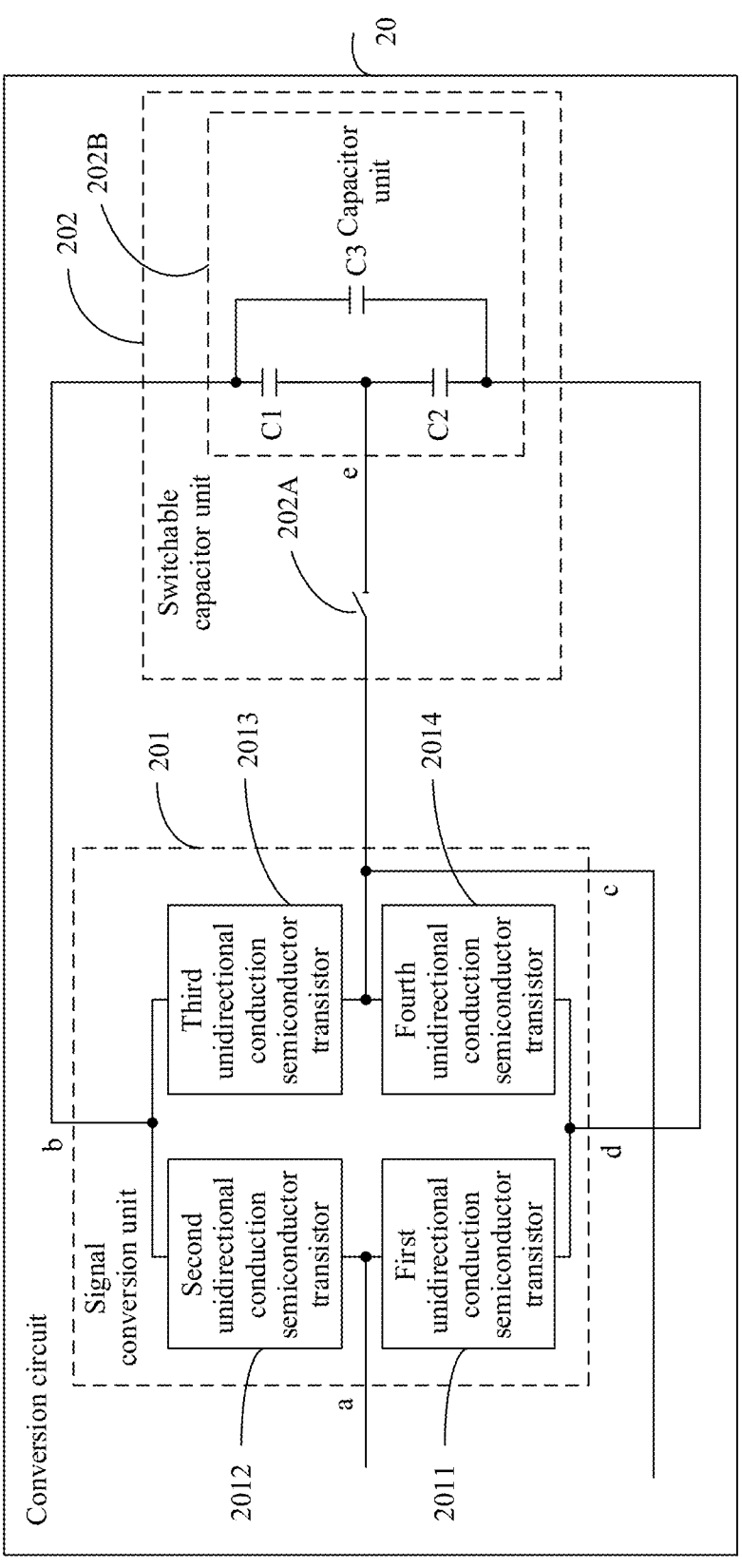
FIG. 3E is a schematic diagram of a structure of a conversion circuit according to an embodiment of this application.

FIG. 3E is a schematic diagram of a structure of a conversion circuit according to an embodiment of this application. As shown in FIG. 3E, based on the embodiment shown in FIG. 3D, the capacitor unit 202B further includes a third capacitor C3. The third capacitor C3 is coupled between the second port b and the fourth port d. The first capacitor C1, the second capacitor C2, and the third capacitor C3 in the foregoing embodiment of this application may be configured to store energy.

Figure 3F:
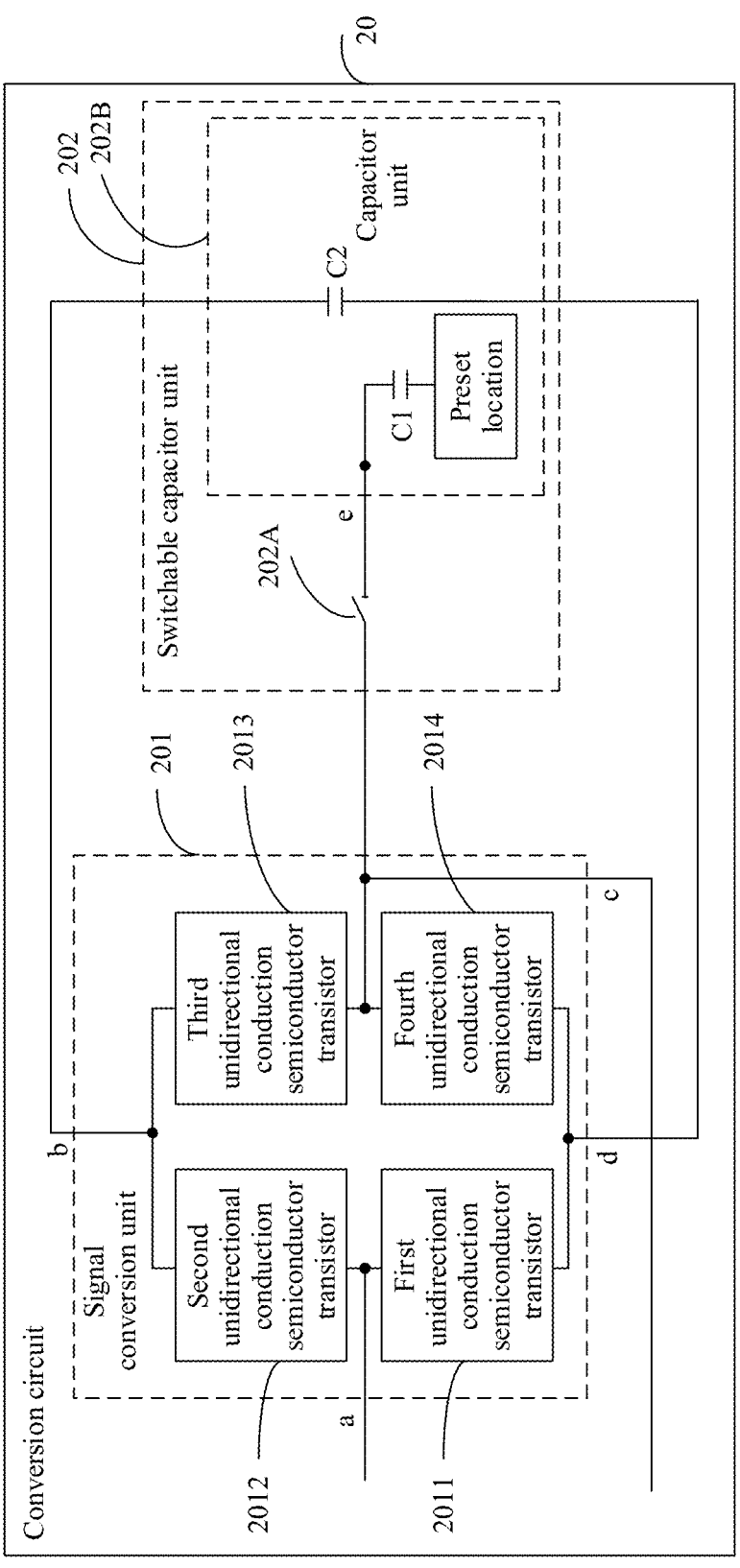
FIG. 3F is a schematic diagram of a structure of a conversion circuit according to an embodiment of this application.

For example, based on the embodiment shown in FIG. 3A, another possible implementation of the capacitor unit 202B in the switchable capacitor unit 202 is described in this embodiment of this application. FIG. 3F is a schematic diagram of a structure of a conversion circuit according to an embodiment of this application. As shown in FIG. 3F, the capacitor unit 202B may include but is not limited to a first capacitor C1 and a second capacitor C2. The first capacitor C1 may be coupled between the internal node e and a preset position, and the second capacitor C2 is coupled between the second port b and the fourth port d. For example, the preset position may include any one of the following: the second port b, the fourth port d, or a preset voltage. For example, the preset voltage may be a preset direct current power supply or a ground voltage.

For example, if the conversion circuit 20 is a rectifier and the first switch 202A is turned on, the first unidirectional conduction semiconductor transistor 2011 and the second unidirectional conduction semiconductor transistor 2012 in the signal conversion unit 201 and the capacitor unit 202B are located in a voltage multiplier rectifier circuit. Alternatively, if the first switch 202A is turned off, the first unidirectional conduction semiconductor transistor 2011, the second unidirectional conduction semiconductor transistor 2012, the third unidirectional conduction semiconductor transistor 2013, and the fourth unidirectional conduction semiconductor transistor 2014 in the signal conversion unit 201 and the capacitor unit 202B are located in a full-bridge rectifier circuit.

For another example, if the conversion circuit 20 is an inverter and the first switch 202A is turned on, the first unidirectional conduction semiconductor transistor 2011 and the second unidirectional conduction semiconductor transistor 2012 in the signal conversion unit 201 and the capacitor unit 202B are located in a voltage division inverter circuit. Alternatively, if the first switch 202A is turned off, the first unidirectional conduction semiconductor transistor 2011, the second unidirectional conduction semiconductor transistor 2012, the third unidirectional conduction semiconductor transistor 2013, and the fourth unidirectional conduction semiconductor transistor 2014 in the signal conversion unit 201 and the capacitor unit 202B are located in a full-bridge inverter circuit.

Figure 4A:
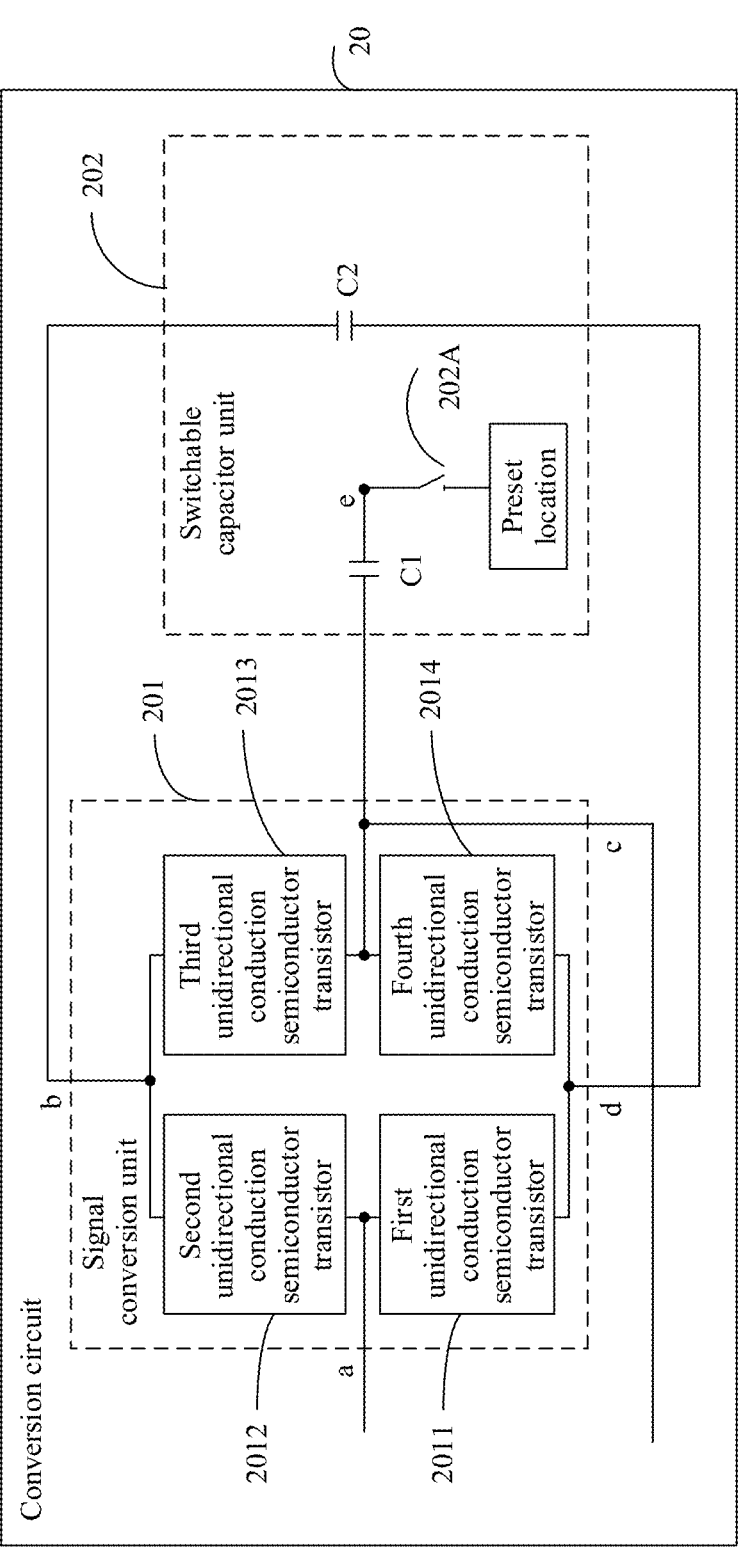
FIG. 4A is a schematic diagram of a structure of a conversion circuit according to an embodiment of this application.

FIG. 4A is a schematic diagram of a structure of a conversion circuit according to an embodiment of this application. Based on any one of the embodiments shown in FIG. 2A to FIG. 2C, another possible implementation of the switchable capacitor unit 202 is described in this embodiment of this application. As shown in FIG. 4A, the switchable capacitor unit 202 may include but is not limited to a first switch 202A, a first capacitor C1, and a second capacitor C2. The first capacitor C1 may be coupled between the third port c and an internal node e, the first switch 202A is coupled between the internal node e and a preset position, and the second capacitor C2 is coupled between the second port b and the fourth port d.

In this embodiment of this application, a conversion mode of the conversion circuit 20 may be switched by turning on or turning off the first switch 202A. For example, if the conversion circuit 20 is a rectifier and the first switch 202A is turned on, the conversion circuit 20 is in the voltage multiplier rectification mode; or if the first switch 202A is turned off, the conversion circuit 20 is in the full-bridge rectification mode. For another example, if the conversion circuit 20 is an inverter and the first switch 202A is turned on, the conversion circuit 20 is in the voltage division inversion mode; or if the first switch 202A is turned off, the conversion circuit 20 is in the full-bridge inversion mode. For example, the preset position may include any one of the following: the second port b, the fourth port d, or a preset voltage. For example, the preset voltage may be a preset direct current power supply or a ground voltage.

Figure 4B:
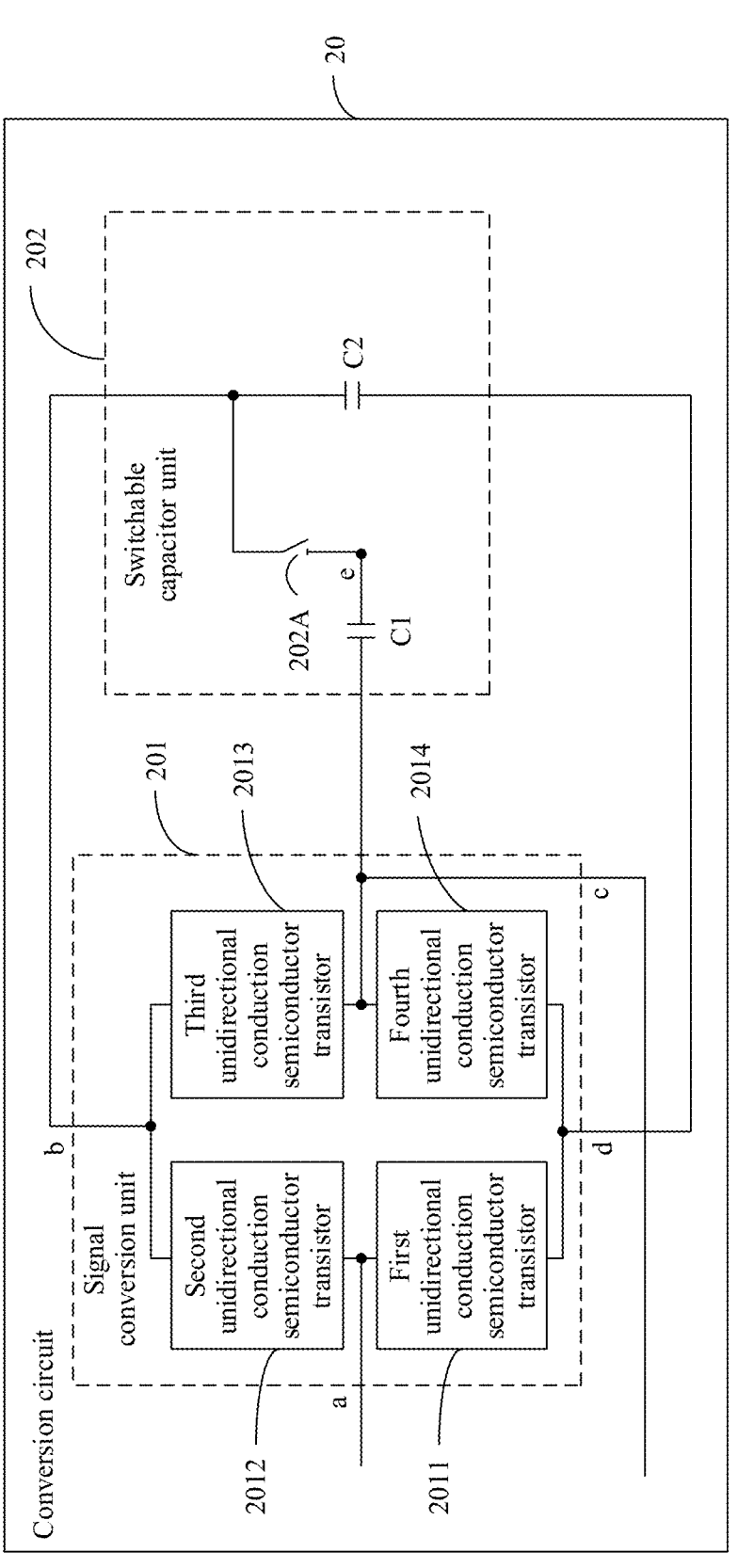
FIG. 4B is a schematic diagram of a structure of a conversion circuit according to an embodiment of this application.
Figure 4C:
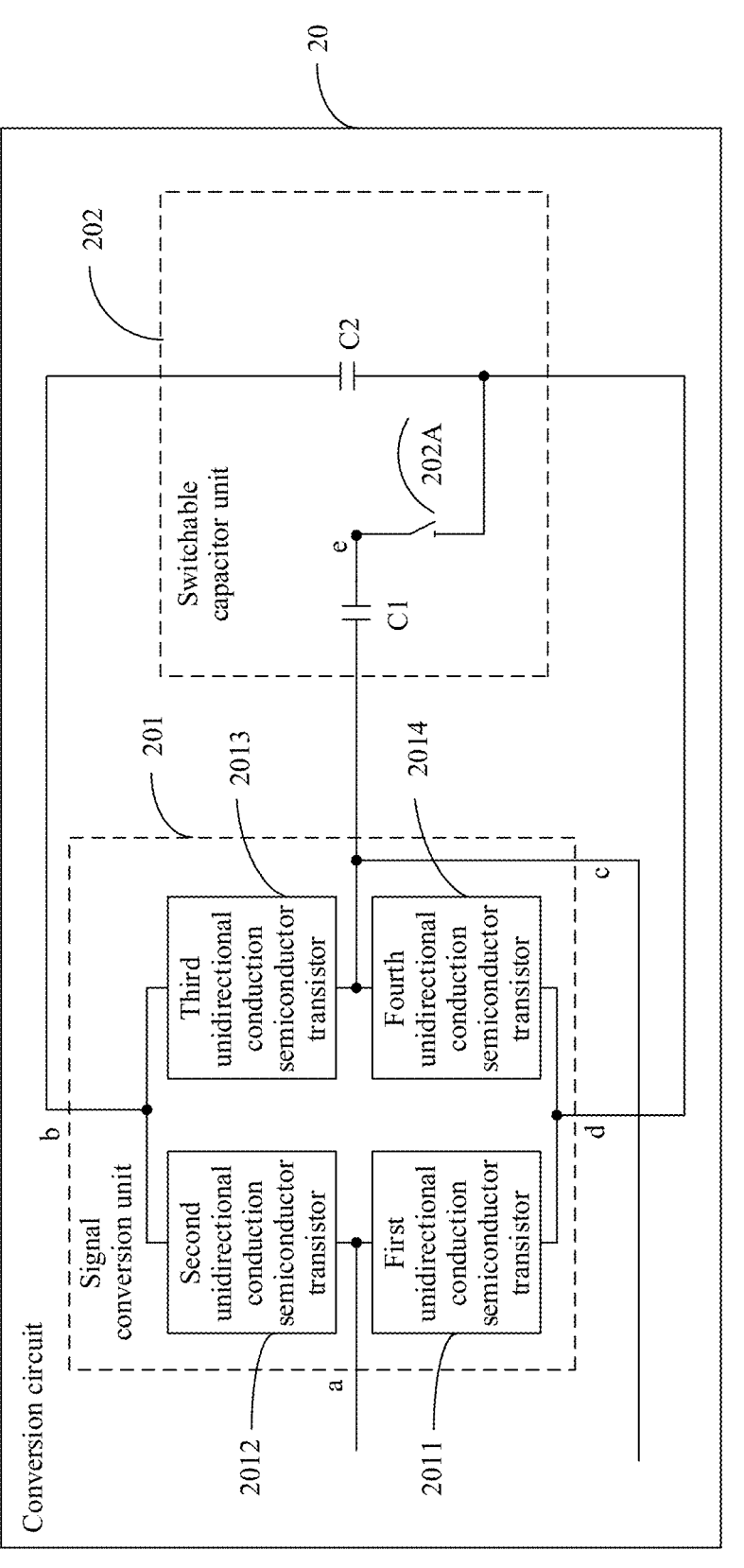
FIG. 4C is a schematic diagram of a structure of a conversion circuit according to an embodiment of this application.

FIG. 4B is a schematic diagram of a structure of a conversion circuit according to an embodiment of this application. As shown in FIG. 4B, based on the embodiment shown in FIG. 4A, the first switch 202A may be coupled between the internal node e and the second port b. FIG. 4C is a schematic diagram of a structure of a conversion circuit according to an embodiment of this application. As shown in FIG. 4C, based on the embodiment shown in FIG. 4A, the first switch 202A may be coupled between the internal node e and the fourth port d.

In the embodiment shown in FIG. 4B or FIG. 4C, for example, if the conversion circuit 20 is a rectifier and the first switch 202A is turned on, the first unidirectional conduction semiconductor transistor 2011 and the second unidirectional conduction semiconductor transistor 2012 in the signal conversion unit 201, the first capacitor C1, and the second capacitor C2 are located in a voltage multiplier rectifier circuit. Alternatively, if the first switch 202A is turned off, the first unidirectional conduction semiconductor transistor 2011, the second unidirectional conduction semiconductor transistor 2012, the third unidirectional conduction semiconductor transistor 2013, and the fourth unidirectional conduction semiconductor transistor 2014 in the signal conversion unit 201 and the second capacitor C2 are located in a full-bridge rectifier circuit.

It should be understood that, if the first unidirectional conduction semiconductor transistor 2011, the second unidirectional conduction semiconductor transistor 2012, the first capacitor C1, and the second capacitor C2 are located in the voltage multiplier rectifier circuit, the conversion circuit 20 is in the voltage multiplier rectification mode. Alternatively, if the first unidirectional conduction semiconductor transistor 2011, the second unidirectional conduction semiconductor transistor 2012, the third unidirectional conduction semiconductor transistor 2013, the fourth unidirectional conduction semiconductor transistor 2014, and the second capacitor C2 are located in the full-bridge rectifier circuit, the conversion circuit 20 is in the full-bridge rectification mode.

For another example, if the conversion circuit 20 is an inverter and the first switch 202A is turned on, the first unidirectional conduction semiconductor transistor 2011 and the second unidirectional conduction semiconductor transistor 2012 in the signal conversion unit 201, the first capacitor C1, and the second capacitor C2 are located in a voltage division inverter circuit. Alternatively, if the first switch 202A is turned off, the first unidirectional conduction semiconductor transistor 2011, the second unidirectional conduction semiconductor transistor 2012, the third unidirectional conduction semiconductor transistor 2013, and the fourth unidirectional conduction semiconductor transistor 2014 in the signal conversion unit 201 and the second capacitor C2 are located in a full-bridge inverter circuit.

It should be understood that, if the first unidirectional conduction semiconductor transistor 2011, the second unidirectional conduction semiconductor transistor 2012, the first capacitor C1, and the second capacitor C2 are located in the voltage division inverter circuit, the conversion circuit 20 is in the voltage division inversion mode. Alternatively, if the first unidirectional conduction semiconductor transistor 2011, the second unidirectional conduction semiconductor transistor 2012, the third unidirectional conduction semiconductor transistor 2013, the fourth unidirectional conduction semiconductor transistor 2014, and the second capacitor C2 are located in the full-bridge inverter circuit, the conversion circuit 20 is in the full-bridge inversion mode.

Figure 4D:
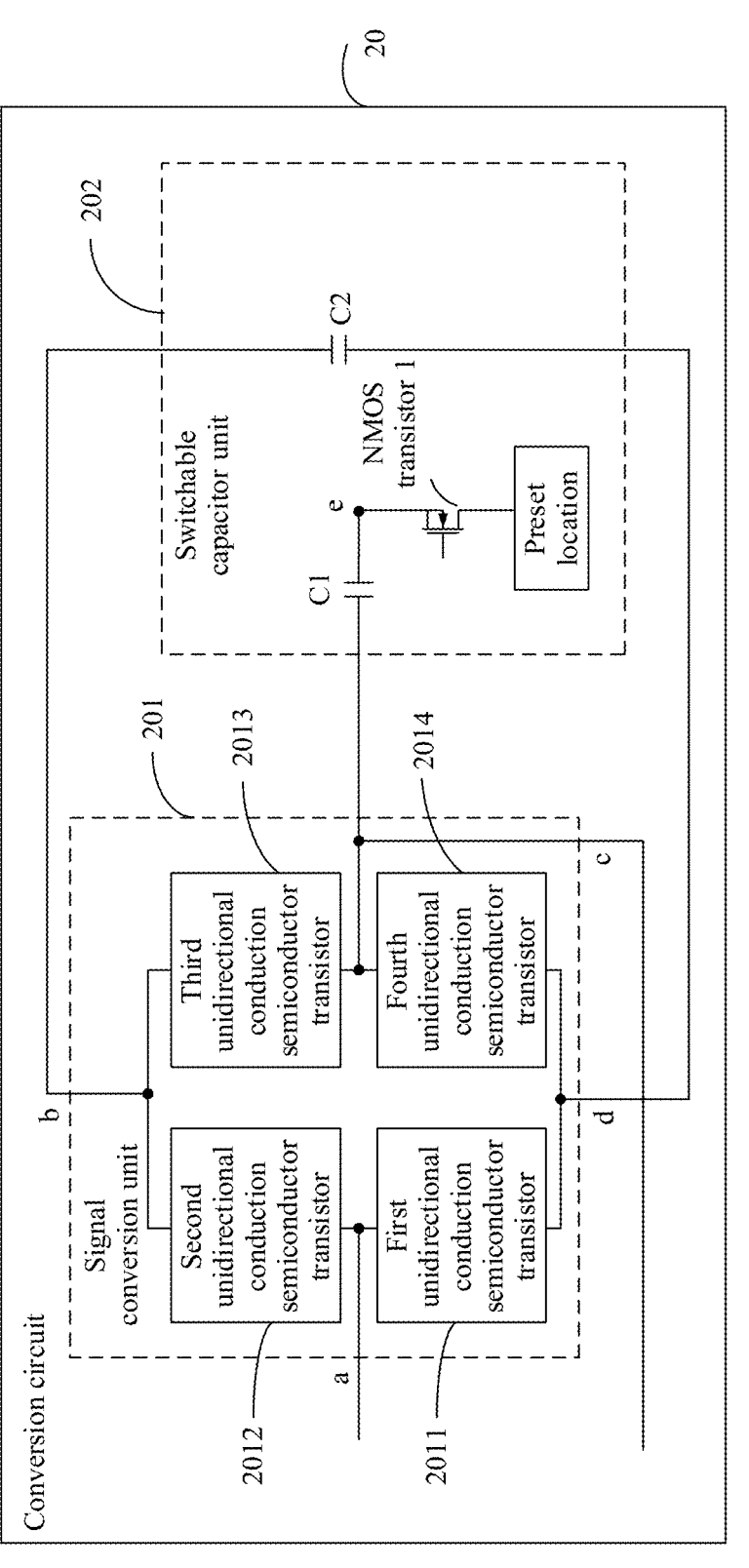
FIG. 4D is a schematic diagram of a structure of a conversion circuit according to an embodiment of this application.

The first switch 202A in this embodiment of this application may be a mechanical switch or a MOS transistor, and the MOS transistor may be a PMOS transistor or an NMOS transistor. FIG. 4D is a schematic diagram of a structure of a conversion circuit according to an embodiment of this application. As shown in FIG. 4D, based on any one of the embodiments shown in FIG. 4A to FIG. 4C, when the first switch 202A is an NMOS transistor 1, a source s of the NMOS transistor 1 may be coupled to the internal node e, and a drain d of the NMOS transistor 1 is coupled to the preset position. It should be noted that a gate g of the NMOS transistor 1 is configured to receive a control signal to control the NMOS transistor 1 to be turned on or turned off. It should be understood that the source s of the NMOS transistor 1 may be coupled to the preset position, and the drain d of the NMOS transistor 1 is coupled to the internal node e (this manner is not shown in the figure).

In addition, based on any one of the embodiments shown in FIG. 4A to FIG. 4C, when the first switch 202A is a PMOS transistor 1, a source s of the PMOS transistor 1 may be coupled to the internal node e, and a drain d of the PMOS transistor 1 is coupled to the preset position. It should be noted that a gate g of the PMOS transistor 1 is configured to receive a control signal to control the PMOS transistor 1 to be turned on or turned off. It should be understood that the source s of the PMOS transistor 1 may be coupled to the preset position, and the drain d of the PMOS transistor 1 is coupled to the internal node e (this manner is not shown in the figure).

Figure 4E:
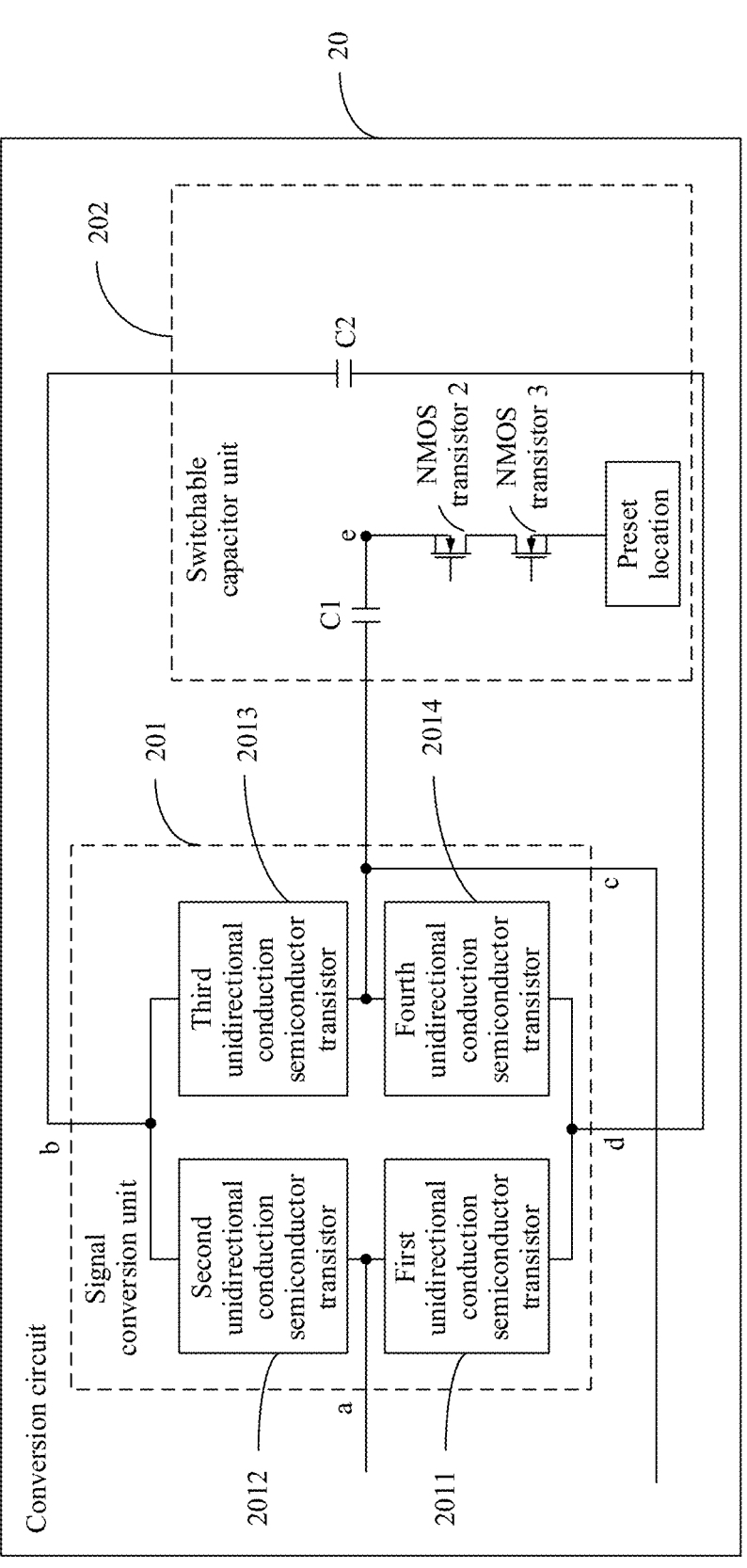
FIG. 4E is a schematic diagram of a structure of a conversion circuit according to an embodiment of this application.

FIG. 4E is a schematic diagram of a structure of a conversion circuit according to an embodiment of this application. As shown in FIG. 4E, based on any one of the embodiments shown in FIG. 4A to FIG. 4C, when the first switch 202A includes an NMOS transistor 2 and an NMOS transistor 3, a source s of the NMOS transistor 2 may be coupled to the internal node e, a drain d of the NMOS transistor 2 is coupled to a drain d of the NMOS transistor 3, and a source s of the NMOS transistor 3 is coupled to the preset position. It should be understood that the drain d of the NMOS transistor 2 may be coupled to the internal node e, the source s of the NMOS transistor 2 is coupled to the source s of the NMOS transistor 3, and the drain d of the NMOS transistor 3 is coupled to the preset position (this manner is not shown in the figure).

It should be noted that gates g of the NMOS transistor 2 and the NMOS transistor 3 are configured to receive a control signal to control a corresponding NMOS transistor to be turned on or turned off. Generally, the NMOS transistor 2 and the NMOS transistor 3 are simultaneously turned on or turned off under control of the control signal, so that bidirectional anti-backflow can be implemented. It should be understood that the NMOS transistor 2 and the NMOS transistor 3 that are configured to implement bidirectional anti-backflow may be replaced with one MOS transistor.

In addition, the first switch 202A may include a PMOS transistor 2 and a PMOS transistor 3. A source s of the PMOS transistor 2 may be coupled to the internal node e, a drain d of the PMOS transistor 2 is coupled to a drain d of the PMOS transistor 3, and a source s of the PMOS transistor 3 is coupled to the preset position. It should be understood that the drain d of the PMOS transistor 2 may be coupled to the internal node e, the source s of the PMOS transistor 2 is coupled to the source s of the PMOS transistor 3, and the drain d of the PMOS transistor 3 is coupled to the preset position (this manner is not shown in the figure).

In addition, the first switch 202A may include one PMOS transistor and one NMOS transistor. A drain of the PMOS transistor may be coupled to the internal node e, a source of the PMOS transistor is coupled to a drain of the NMOS transistor, and a source of the NMOS transistor may be coupled to the preset position (this manner is not shown in the figure). Alternatively, a source of the PMOS transistor may be coupled to the internal node e, a drain of the PMOS transistor is coupled to a source of the NMOS transistor, and a drain of the NMOS transistor may be coupled to the preset position (this manner is not shown in the figure). Certainly, the first switch 202A may be another component that has a switch function. This is not limited in this embodiment of this application.

To enable an output voltage of the conversion circuit to have a larger variable dynamic range, based on any one of the embodiments shown in FIG. 3A to FIG. 3F, the switchable capacitor unit 202 may further include a first switching unit and a second switching unit.

Figure 5:
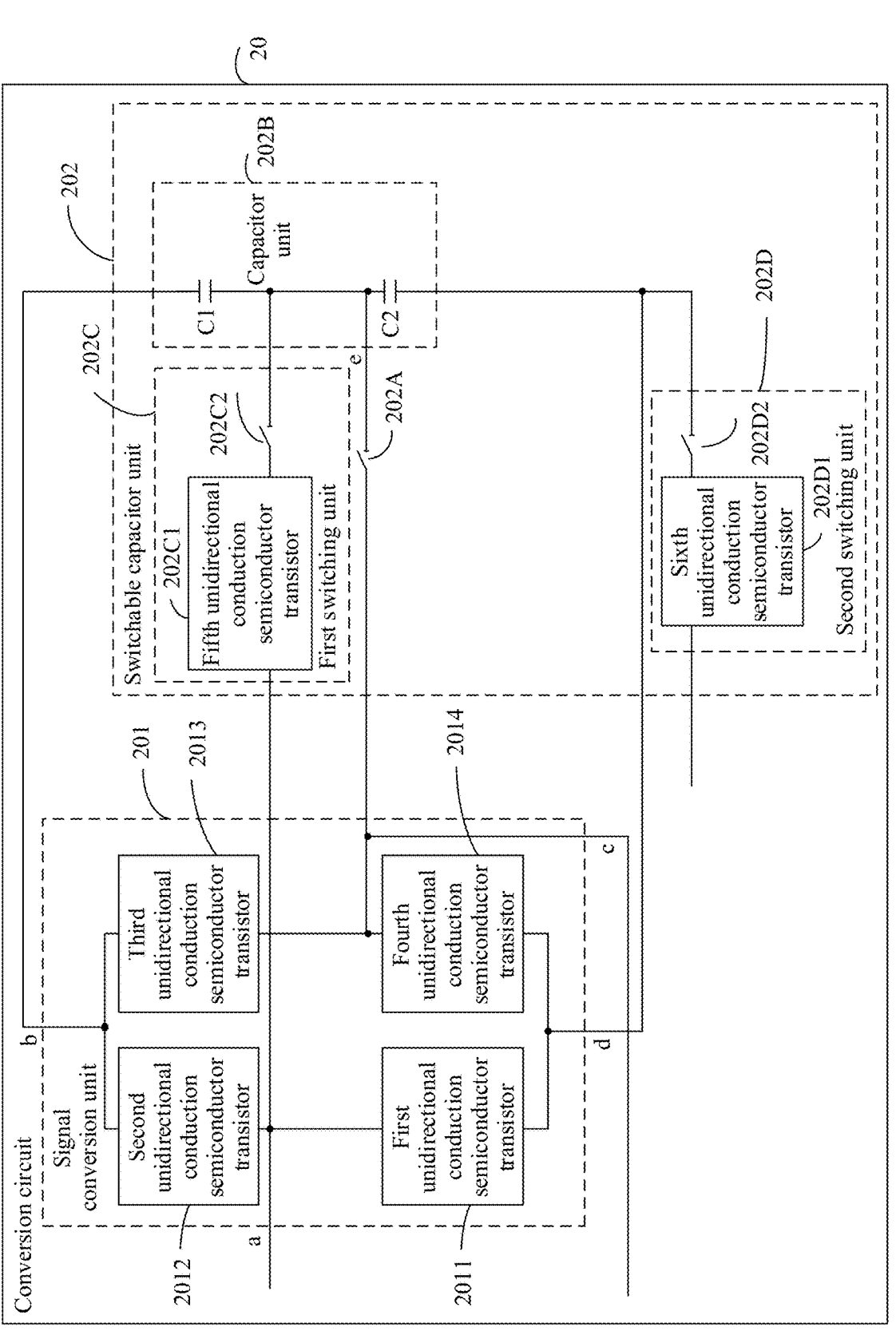
FIG. 5 is a schematic diagram of a structure of a conversion circuit according to an embodiment of this application.

For example, based on the embodiment shown in FIG. 3D, the switchable capacitor unit 202 is further described in this embodiment of this application. FIG. 5 is a schematic diagram of a structure of a conversion circuit according to an embodiment of this application. As shown in FIG. 5, the switchable capacitor unit 202 may further include a first switching unit 202C and a second switching unit 202D. The first switching unit 202C is coupled between the internal node e and the first port a, one port of the second switching unit 202D may be coupled to the fourth port d, and the other port of the second switching unit 202D may be coupled to a connection point (not shown in the figure) between a coil and a resonant capacitor in a resonant circuit. For example, if the conversion circuit 20 is an inverter and is disposed in the wireless charging transmitter 1, the other port of the second switching unit 202D may be coupled to a connection point between the transmit coil 13 and the resonant capacitor 12 in the resonant circuit 14. For another example, if the conversion circuit 20 is a rectifier and is disposed in the wireless charging receiver 2, the other port of the second switching unit 202D may be coupled to a connection point between the receive coil 23 and the resonant capacitor in the resonant circuit 24.

For example, the first switching unit 202C may include but is not limited to a fifth unidirectional conduction semiconductor transistor 202C1 and a second switch 202C2. The second switch 202C2 may be coupled between the internal node e and an input port of the fifth unidirectional conduction semiconductor transistor 202C1, and an output port of the fifth unidirectional conduction semiconductor transistor 202C1 is coupled to the first port a. It should be understood that positions of the second switch 202C2 and the fifth unidirectional conduction semiconductor transistor 202C1 may be interchanged. For example, the input port of the fifth unidirectional conduction semiconductor transistor 202C1 is coupled to the internal node e, and the second switch 202C2 is coupled between the first port a and the output port of the fifth unidirectional conduction semiconductor transistor 202C1 (this manner is not shown in the figure).

The second switch 202C2 in this embodiment of this application may be a mechanical switch or a MOS transistor, and the MOS transistor may be a PMOS transistor or an NMOS transistor. When the second switch 202C2 is a MOS transistor, a source and a drain of the MOS transistor are used as two ports of the second switch 202C2 to be respectively coupled to the internal node e and the input port of the fifth unidirectional conduction semiconductor transistor 202C1.

The fifth unidirectional conduction semiconductor transistor 202C1 in this embodiment of this application may be a diode or a MOS transistor, and the MOS transistor may be a PMOS transistor or an NMOS transistor. For example, if the fifth unidirectional conduction semiconductor transistor 202C1 is a diode, correspondingly, the input port of the fifth unidirectional conduction semiconductor transistor 202C1 may be an anode of the diode, and the output port of the fifth unidirectional conduction semiconductor transistor 202C1 may be a cathode of the diode.

For another example, if the fifth unidirectional conduction semiconductor transistor 202C1 is a MOS transistor, the input port of the fifth unidirectional conduction semiconductor transistor 202C1 may be a source of the MOS transistor, and the output port of the fifth unidirectional conduction semiconductor transistor 202C1 may be a drain of the MOS transistor. Alternatively, the input port of the fifth unidirectional conduction semiconductor transistor 202C1 may be a drain of the MOS transistor, and the output port of the fifth unidirectional conduction semiconductor transistor 202C1 may be a source of the MOS transistor.

It should be understood that, which electrode of the MOS transistor the input port and/or the output port of the fifth unidirectional conduction semiconductor transistor 202C1 are/is may be further determined based on a type of the second switch 202C2 and a connection relationship between the fifth unidirectional conduction semiconductor transistor 202C1 and the second switch 202C2. For example, if the second switch 202C2 is an NMOS transistor 4, and the fifth unidirectional conduction semiconductor transistor 202C1 is an NMOS transistor 5, a source of the NMOS transistor 4 may be coupled to a source of the NMOS transistor 5, or a drain of the NMOS transistor 4 is coupled to a drain of the NMOS transistor 5. For another example, if the second switch 202C2 is a PMOS transistor 4, and the fifth unidirectional conduction semiconductor transistor 202C1 is a PMOS transistor 5, a source of the PMOS transistor 4 may be coupled to a source of the PMOS transistor 5, or a drain of the PMOS transistor 4 is coupled to a drain of the PMOS transistor 5.

For another example, if the second switch 202C2 is a mechanical switch, and the fifth unidirectional conduction semiconductor transistor 202C1 is a MOS transistor, a source of the MOS transistor may be coupled to the mechanical switch, or a drain of the MOS transistor is coupled to the mechanical switch. For another example, if the fifth unidirectional conduction semiconductor transistor 202C1 is a PMOS transistor, and the second switch 202C2 is an NMOS transistor, a source of the PMOS transistor may be coupled to a drain of the NMOS transistor, or a drain of the PMOS transistor is coupled to a source of the NMOS transistor.

It should be noted that, in this case, a gate of the fifth unidirectional conduction semiconductor transistor 202C1 is used as a control pin to receive a control signal to control the fifth unidirectional conduction semiconductor transistor 202C1 to be turned on or turned off, and prevent the fifth unidirectional conduction semiconductor transistor 202C1 from being reversely turned on.

It should be understood that positions of the fifth unidirectional conduction semiconductor transistor 202C1 and the second switch 202C2 may be interchanged.

For example, the second switching unit 202D may include but is not limited to a sixth unidirectional conduction semiconductor transistor 202D1 and a third switch 202D2. The third switch 202D2 may be coupled between the fourth port d and an input port of the sixth unidirectional conduction semiconductor transistor 202D1, and an output port of the sixth unidirectional conduction semiconductor transistor 202D1 may be coupled to the connection point (not shown in the figure) between the coil and the resonant capacitor in the resonant circuit. For example, if the conversion circuit 20 is an inverter and is disposed in the wireless charging transmitter 1, the output port of the sixth unidirectional conduction semiconductor transistor 202D1 may be coupled to the connection point between the transmit coil 13 and the resonant capacitor 12 in the resonant circuit 14. For another example, if the conversion circuit 20 is a rectifier and is disposed in the wireless charging receiver 2, the output port of the sixth unidirectional conduction semiconductor transistor 202D1 may be coupled to the connection point between the receive coil 23 and the resonant capacitor in the resonant circuit 24.

It should be understood that positions of the third switch 202D2 and the sixth unidirectional conduction semiconductor transistor 202D1 may be interchanged. For example, the input port of the sixth unidirectional conduction semiconductor transistor 202D1 is coupled to the fourth port d, and the third switch 202D2 is coupled to a connection point between the output port of the sixth unidirectional conduction semiconductor transistor 202D1 and the resonant circuit (this manner is not shown in the figure).

The third switch 202D2 in this embodiment of this application may be a mechanical switch or a MOS transistor, and the MOS transistor may be a PMOS transistor or an NMOS transistor. For example, when the third switch 202D2 is a MOS transistor, a source and a drain of the MOS transistor are used as two ports of the third switch 202D2 to be respectively coupled to the fourth port d and the input port of the sixth unidirectional conduction semiconductor transistor 202D1. It should be understood that the source and the drain of the MOS transistor may be used as two ports of the third switch 202D2 to be respectively coupled to the output port of the sixth unidirectional conduction semiconductor transistor 202D1 and the connection point between the coil and the resonant capacitor in the resonant circuit.

The sixth unidirectional conduction semiconductor transistor 202D1 in this embodiment of this application may be a diode or a MOS transistor, and the MOS transistor may be a PMOS transistor or an NMOS transistor. For example, if the sixth unidirectional conduction semiconductor transistor 202D1 is a diode, correspondingly, the input port of the sixth unidirectional conduction semiconductor transistor 202D1 may be an anode of the diode, and the output port of the sixth unidirectional conduction semiconductor transistor 202D1 may be a cathode of the diode.

For another example, if the sixth unidirectional conduction semiconductor transistor 202D1 is a MOS transistor, the input port of the sixth unidirectional conduction semiconductor transistor 202D1 may be a source of the MOS transistor, and the output port of the sixth unidirectional conduction semiconductor transistor 202D1 may be a drain of the MOS transistor. Alternatively, the input port of the sixth unidirectional conduction semiconductor transistor 202D1 may be a drain of the MOS transistor, and the output port of the sixth unidirectional conduction semiconductor transistor 202D1 may be a source of the MOS transistor.

It should be understood that, which electrode of the MOS transistor the input port and/or the output port of the sixth unidirectional conduction semiconductor transistor 202D1 are/is may be determined based on a type of the third switch 202D2 and a connection relationship the sixth unidirectional conduction semiconductor transistor 202D1 and the third switch 202D2. For example, if the third switch 202D2 is an NMOS transistor 6, and the sixth unidirectional conduction semiconductor transistor 202D1 is an NMOS transistor 7, a source of the NMOS transistor 6 may be coupled to a source of the NMOS transistor 7, or a drain of the NMOS transistor 6 is coupled to a drain of the NMOS transistor 7. For another example, if the third switch 202D2 is a PMOS transistor 6, and the sixth unidirectional conduction semiconductor transistor 202D1 is a PMOS transistor 7, a source of the PMOS transistor 6 may be coupled to a source of the PMOS transistor 7, or a drain of the PMOS transistor 6 is coupled to a drain of the PMOS transistor 7.

For another example, if the third switch 202D2 is a mechanical switch, and the sixth unidirectional conduction semiconductor transistor 202D1 is a MOS transistor, a source of the MOS transistor may be coupled to the mechanical switch, or a drain of the MOS transistor is coupled to the mechanical switch. For another example, if the sixth unidirectional conduction semiconductor transistor 202D1 is a PMOS transistor, and the third switch 202D2 is an NMOS transistor, a source of the PMOS transistor may be coupled to a drain of the NMOS transistor, or a drain of the PMOS transistor is coupled to a source of the NMOS transistor.

It should be noted that, in this case, a gate of the sixth unidirectional conduction semiconductor transistor 202D1 is used as a control pin to receive a control signal to control the sixth unidirectional conduction semiconductor transistor 202D1 to be turned on or turned off, and prevent the sixth unidirectional conduction semiconductor transistor 202D1 from being unintendedly turned on. It should be understood that positions of the sixth unidirectional conduction semiconductor transistor 202D1 and the third switch 202D2 may be interchanged.

In the embodiment shown in FIG. 5, the conversion mode of the conversion circuit 20 may be switched by turning off or turning on the fifth unidirectional conduction semiconductor transistor 202C1 and the second switch 202C2 in the first switching unit 202C, and the sixth unidirectional conduction semiconductor transistor 202D1 and the third switch 202D2 in the second switching unit 202D in cooperation with turning on or turning off the first switch 202A.

For example, if the conversion circuit 20 is a rectifier, the first switch 202A is turned on, the fifth unidirectional conduction semiconductor transistor 202C1 and/or the second switch 202C2 in the first switching unit 202C are/is turned off, and the sixth unidirectional conduction semiconductor transistor 202D1 and/or the third switch 202D2 in the second switching unit 202D are/is turned off, the conversion circuit 20 is in the n1 voltage multiplier rectification mode. For example, when the conversion circuit 20 is in the n1 (for example, 2) voltage multiplier rectification mode, a relationship between an output voltage and an input voltage thereof may meet the following equation: Output voltage=twice the input voltage—on-voltage drop of the unidirectional conduction semiconductor transistor in the signal conversion unit 201— on-voltage drop of the first switch 202A.

For another example, if the conversion circuit 20 is an inverter, the first switch 202A is turned on, the fifth unidirectional conduction semiconductor transistor 202C1 and/or the second switch 202C2 in the first switching unit 202C are/is turned off, and the sixth unidirectional conduction semiconductor transistor 202D1 and/or the third switch 202D2 in the second switching unit 202D are/is turned off, the conversion circuit 20 is in the 1/n1 voltage division inversion mode. For example, when the conversion circuit 20 is in the 1/n1 voltage division inversion mode, a relationship between an input voltage and an output voltage thereof may meet the following equation: Input voltage=twice the output voltage—on-voltage drop of the unidirectional conduction semiconductor transistor in the signal conversion unit 201— on-voltage drop of the first switch 202A.

For another example, if the conversion circuit 20 is a rectifier, and the first switch 202A, the second switch 202C2 in the first switching unit 202C, and the third switch 202D2 in the second switching unit 202D are turned on, the conversion circuit 20 is in the n2 (for example, 3) voltage multiplier rectification mode. For example, when the conversion circuit 20 is in the n2 voltage multiplier rectification mode, a relationship between an output voltage and an input voltage thereof may meet the following equation: Output voltage=three times of the input voltage—on-voltage drop of the unidirectional conduction semiconductor transistor in the signal conversion unit 201— on-voltage drops of the fifth unidirectional conduction semiconductor transistor 202C1 and the second switch 202C2 in the first switching unit 202C— on-voltage drops of the sixth unidirectional conduction semiconductor transistor 202D1 and the third switch 202D2 in the second switching unit 202D.

For another example, if the conversion circuit 20 is an inverter, and the first switch 202A, the second switch 202C2 in the first switching unit 202C, and the third switch 202D2 in the second switching unit 202D are turned on, the conversion circuit 20 is in the 1/n2 voltage division inversion mode. For example, when the conversion circuit 20 is in the 1/n2 voltage division inversion mode, a relationship between an input voltage and an output voltage thereof may meet the following equation: Input voltage=three times of the output voltage—on-voltage drop of the unidirectional conduction semiconductor transistor in the signal conversion unit 201— on-voltage drops of the fifth unidirectional conduction semiconductor transistor 202C1 and the second switch 202C2 in the first switching unit 202C— on-voltage drops of the sixth unidirectional conduction semiconductor transistor 202D1 and the third switch 202D2 in the second switching unit 202D.

For another example, if the conversion circuit 20 is a rectifier, the first switch 202A is turned off, the fifth unidirectional conduction semiconductor transistor 202C1 and/or the second switch 202C2 in the first switching unit 202C are/is turned off, and the sixth unidirectional conduction semiconductor transistor 202D1 and/or the third switch 202D2 in the second switching unit 202D are/is turned off, the conversion circuit 20 is in the full-bridge rectification mode.

For another example, if the conversion circuit 20 is an inverter, the first switch 202A is turned off, the fifth unidirectional conduction semiconductor transistor 202C1 and/or the second switch 202C2 in the first switching unit 202C are/is turned off, and the sixth unidirectional conduction semiconductor transistor 202D1 and/or the third switch 202D2 in the second switching unit 202D are/is turned off, the conversion circuit 20 is in the full-bridge inversion mode.

In conclusion, according to the conversion circuit 20 provided in this embodiment of this application, more conversion modes of the conversion circuit 20 may be switched by turning on or turning off the first switching unit 202C and the second switching unit 202D in cooperation with turn-on or turn-off of the first switch 202A. For example, if the conversion circuit 20 is a rectifier, more rectification modes of the rectifier may be switched by turning on or turning off the first switching unit 202C and the second switching unit 202D in cooperation with turn-on or turn-off of the first switch 202A. Alternatively, if the conversion circuit 20 is an inverter, more inversion modes of the inverter may be switched by turning on or turning off the first switching unit 202C and the second switching unit 202D in cooperation with turning on or turning off the first switch 202A. It may be learned that the variable dynamic range of the output voltage of the rectifier or the inverter provided in this embodiment of this application is further increased.

It should be noted that, based on any one of the embodiments shown in FIG. 3E, FIG. 3F, and FIG. 4A to 4E, for an implementation of the switchable capacitor unit 202, refer to related descriptions of the switchable capacitor unit 202 based on the embodiment shown in FIG. 3D. Details are not described herein again.

Figure 6A:
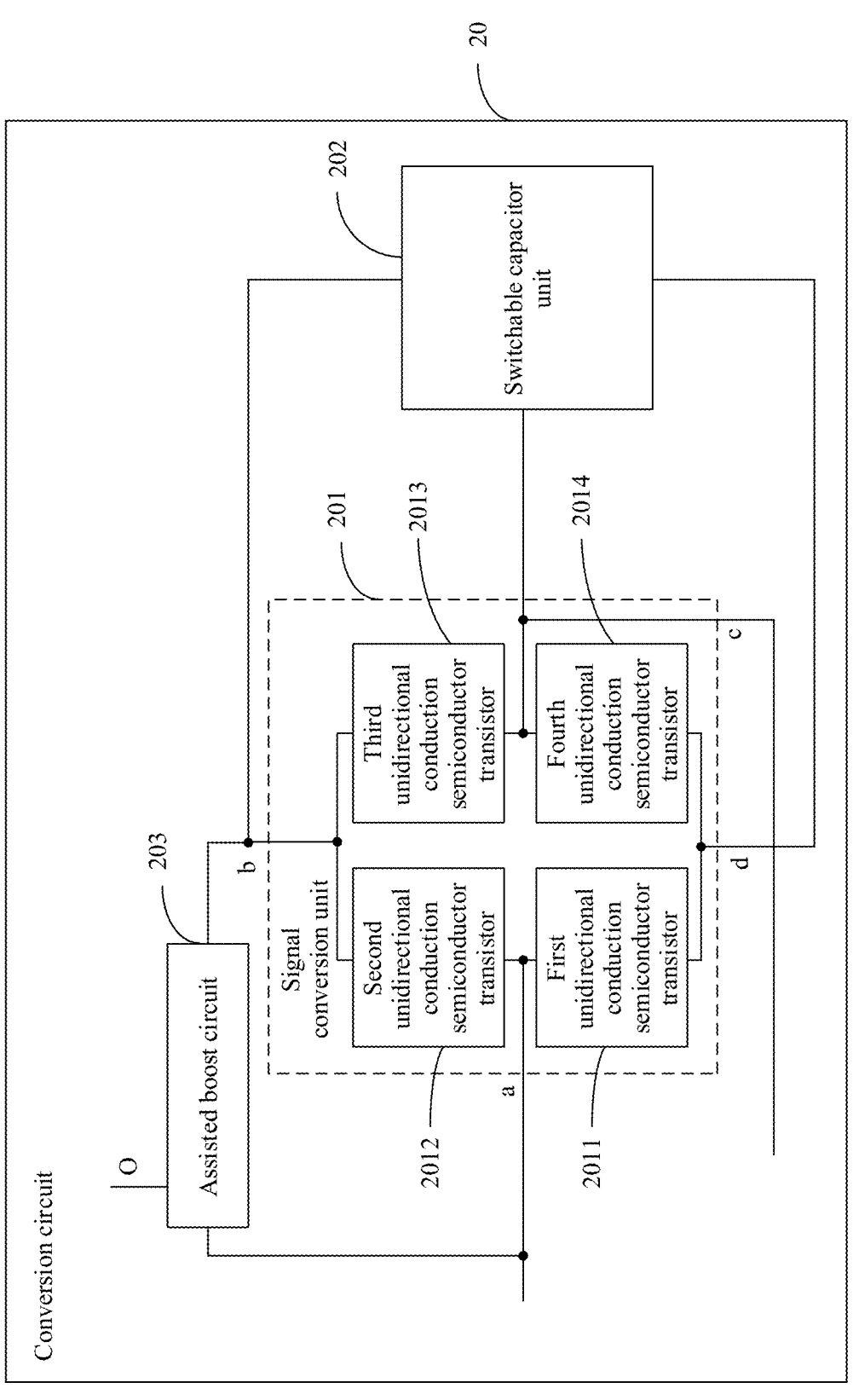
FIG. 6A is a schematic diagram of a structure of a conversion circuit according to an embodiment of this application.

FIG. 6A is a schematic diagram of a structure of a conversion circuit according to an embodiment of this application. If the conversion circuit 20 is a rectifier, because a voltage of an input port of the conversion circuit 20 is small in some cases, to avoid an impact on switching of the rectification mode of the conversion circuit 20, the conversion circuit 20 provided in this embodiment of this application may further include an assisted boost circuit. As shown in FIG. 6A, based on any one of the foregoing embodiments, the conversion circuit 20 further includes an assisted boost circuit 203. The assisted boost circuit 203 may be coupled between the first port a and the second port b, and an output port 0 of the assisted boost circuit 203 may be configured to be coupled to a controller.

For example, the assisted boost circuit 203 is configured to perform voltage boost on a voltage of the first port a, so that a voltage obtained after voltage boost meets a startup voltage of the controller, and the controller can generate a switching signal used to control the switchable capacitor unit 202 and a control signal used to control each unidirectional conduction semiconductor transistor in the signal conversion unit 201, to switch the rectification mode of the conversion circuit 20. For a specific control process of the controller, refer to the following related descriptions of the controller in FIG. 7A or FIG. 7B.

Figure 6B:
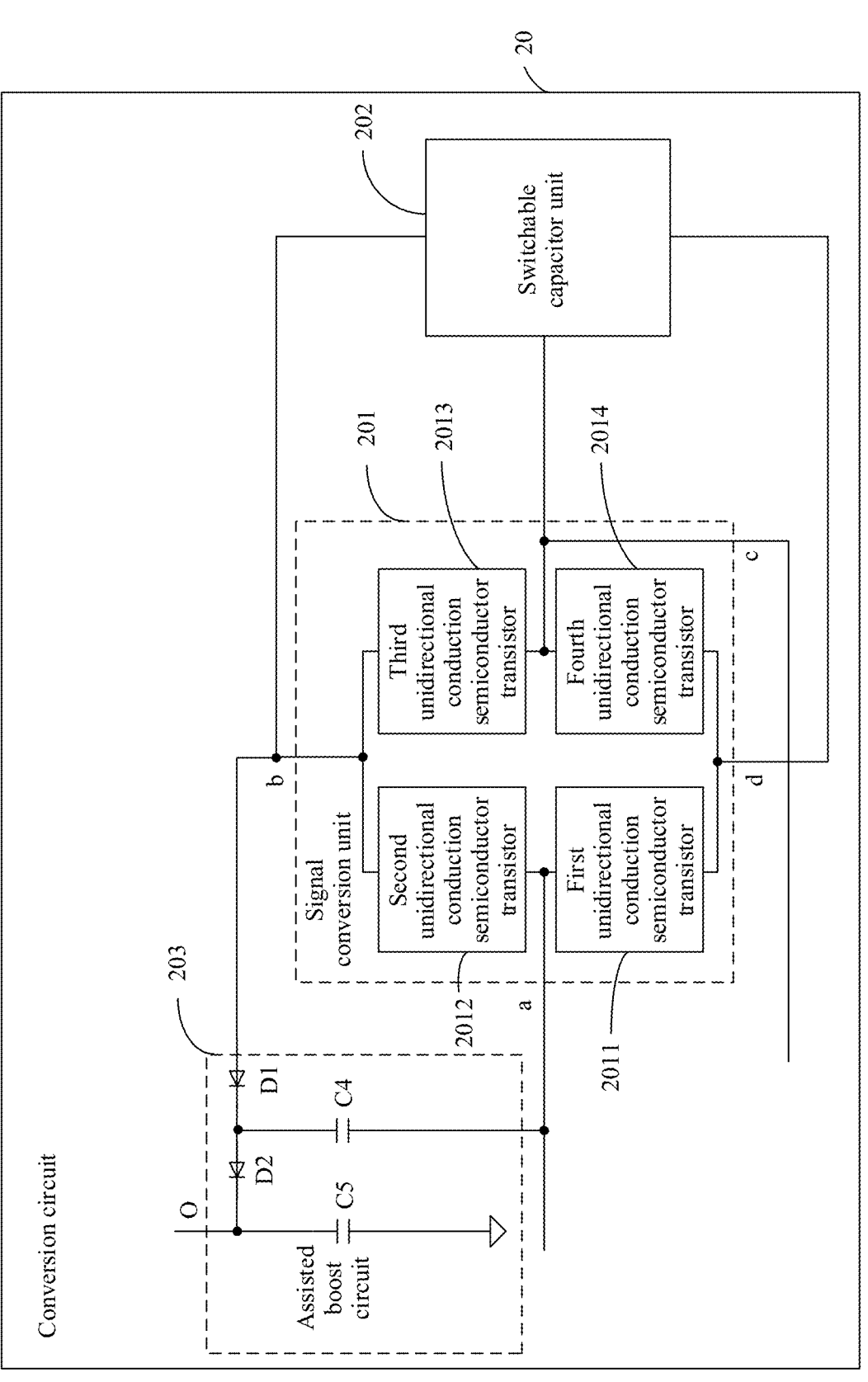
FIG. 6B is a schematic diagram of a structure of a conversion circuit according to an embodiment of this application.

FIG. 6B is a schematic diagram of a structure of a conversion circuit according to an embodiment of this application. Based on the embodiment shown in FIG. 6A, an implementation of the assisted boost circuit 203 is described in this embodiment of this application. As shown in FIG. 6B, the assisted boost circuit 203 may include but is not limited to a first diode D1, a second diode D2, a fourth capacitor C4, and a fifth capacitor C5. An input port of the first diode D1 is coupled to the second port b, an input port of the second diode D2 and a first port of the fourth capacitor C4 are coupled to an output port of the first diode D1, a second port of the fourth capacitor C4 is coupled to the first port a, an output port of the second diode D2 and a first port of the fifth capacitor C5 are coupled to the output port 0, and a second port of the fifth capacitor C5 is grounded.

One time period is used as an example. In the assisted boost circuit 203 provided in this embodiment of this application, in the first half period, when the voltage of the first port a is less than a voltage of the third port c, the fourth capacitor C4 is charged by using the third unidirectional conduction semiconductor transistor 2013 and the first diode D1, so that a voltage of an upper end of the fourth capacitor C4 is approximately equal to a voltage between the first port a and the third port c. In the second half period, when the voltage of the third port c is less than the voltage of the first port a, the fifth capacitor C5 is charged by using the fourth capacitor C4 and the second diode D2. Because C4 has been charged to have a specified voltage in the first half period, during charging in the second half period, a voltage of an upper end (namely, the output port 0) of the fifth capacitor C5 is approximately equal to a sum of the voltage between the first port a and the third port c and a voltage of two ports of the fourth capacitor C4. It may be learned that the voltage of the output port 0 may be approximately twice the voltage of the first port a, so that the startup voltage of the controller can be met. For example, in a ping (or referred to as a protocol initial power-on) phase, with the assisted boost circuit 203, the voltage of the output port 0 may be increased, so that the startup voltage of the controller can be met, and a degree of freedom in the ping phase can be improved. The degree of freedom in this embodiment of this application is a placement location relationship between the wireless charging transmitter and the wireless charging receiver, including horizontal and spatial distances.

An implementation of the wireless charging device is described in the following embodiments of this application. In a possible implementation, the wireless charging device is configured to receive a wireless charging signal. In this case, the wireless charging device is the wireless charging receiver 2. The wireless charging receiver 2 may include but is not limited to the resonant circuit 24 and the rectifier 21.

For ease of understanding, based on the foregoing embodiments, in this embodiment of this application, an example in which the conversion circuit 20 shown in FIG. 2A is the rectifier 21 and the resonant circuit 24 includes the receive coil 23 and the resonant capacitor 22 is used to describe an implementation of the wireless charging device provided in this embodiment of this application.

Figure 7A:
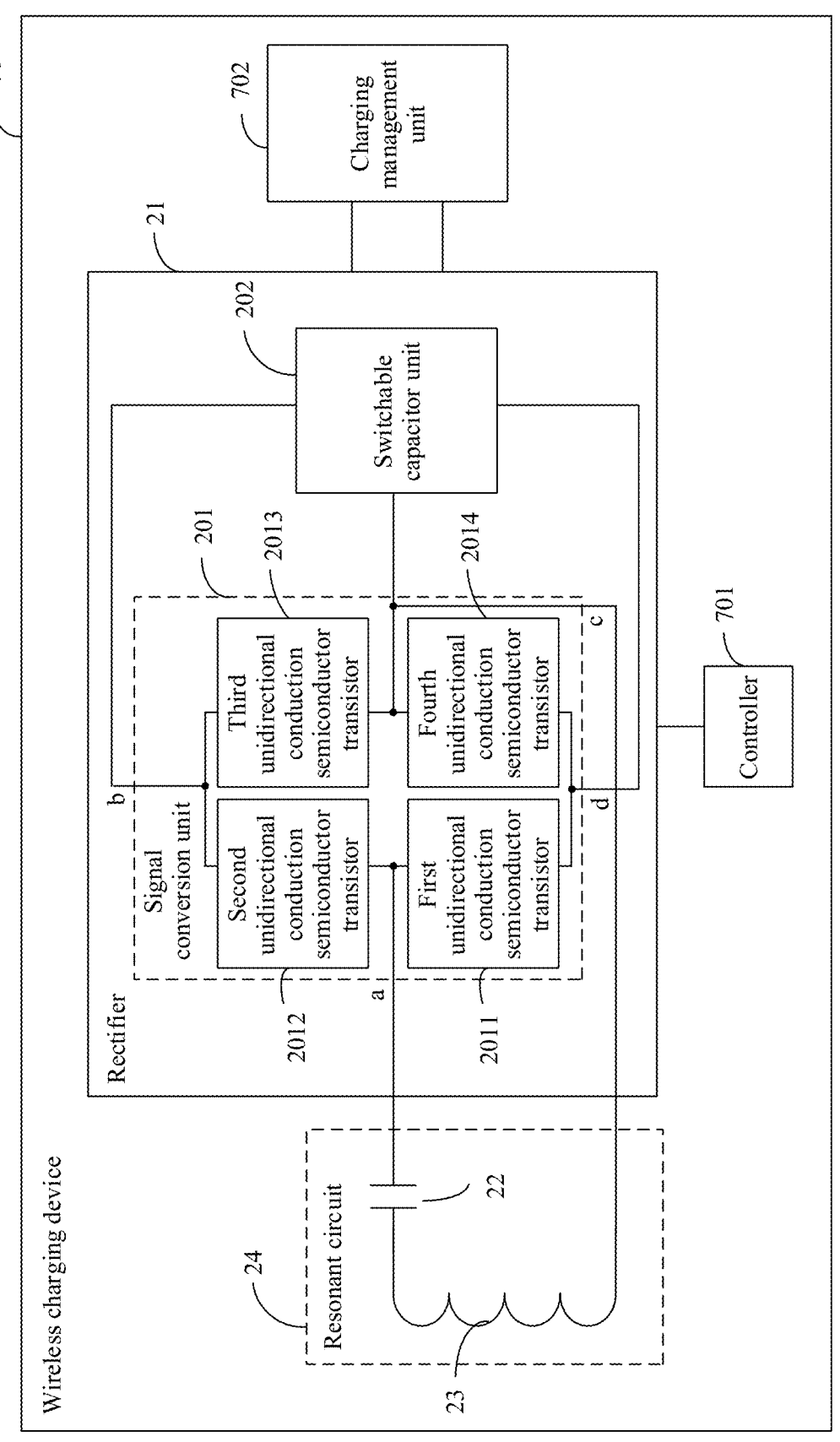
FIG. 7A is a schematic diagram of a structure of a wireless charging device according to an embodiment of this application.

FIG. 7A is a schematic diagram of a structure of a wireless charging device according to an embodiment of this application. As shown in FIG. 7A, a wireless charging device 70 provided in this embodiment of this application may include but is not limited to the resonant circuit 24, the rectifier 21, a controller 701, and a charging management unit 702. The controller 701 is coupled to the rectifier 21, and is configured to control the signal conversion unit 201 and the switchable capacitor unit 202 in the rectifier 21. For example, the controller 701 may be connected to a gate of a unidirectional conduction semiconductor transistor in the signal conversion unit 201, and connected to a switch and a gate of a unidirectional conduction semiconductor transistor in the switchable capacitor unit 202.

The first port a and the third port c of the rectifier 21 are used as input ports to be respectively coupled to two ports of the resonant circuit 24, and are configured to receive an electrical signal obtained by the resonant circuit 24 by converting an electromagnetic signal received from a transmit coil of a peer end. The second port b and the fourth port d of the rectifier 21 are output ports of the rectifier 21, and are configured to be coupled to the charging management unit 702 that is configured to perform voltage conversion (for example, voltage buck) on an output voltage of the output port of the rectifier 21, to match a storage voltage of a subsequent electric energy storage unit. For example, the electric energy storage unit may include but is not limited to a battery. It should be noted that the electric energy storage unit may belong to the wireless charging device 70, or may belong to an electronic device connected to the wireless charging device 70.

To implement high-power charging by increasing a current, an inductance value of the receive coil 23 in the resonant circuit 24 in this embodiment of this application is less than an inductance value of a standard receive coil, so that a resistance of the receive coil can be reduced, heat consumption of the receive coil can be reduced, and a through-current capability of the receive coil can be improved. For a wireless charging device that complies with the international wireless charging standard Qi protocol introduced by the Wireless Power Consortium (WPC), a shape and a specification of a coil of a transmit end are specifically specified in the protocol. A requirement on a voltage to which the standard receive coil is coupled is as follows: In a ping phase, a voltage to which the standard receive coil is coupled needs to be greater than 2.7 V, so that a chip of the wireless charging device can be normally powered on. In an initial power transmission phase, the voltage to which the standard receive coil is coupled needs to be greater than 5 V, so that a cascade device can be charged. For example, the inductance value of the receive coil in this embodiment of this application may be $1/(n^2)$ of the inductance value of the standard receive coil.

When the inductance value of the receive coil is reduced, a voltage to which the receive coil 23 is coupled from the transmit coil of the peer end is definitely reduced. To ensure an output voltage requirement of the wireless charging device, in this embodiment of this application, the controller 701 is configured to control the switchable capacitor unit 202 in the rectifier 21 to switch a rectification mode of the rectifier 21. The rectification mode includes a voltage multiplier rectification mode or a full-bridge rectification mode. It should be understood that the controller 701 is further configured to control each unidirectional conduction semiconductor transistor in the signal conversion unit 201 to be turned on or turned off.

Specifically, the controller 701 may switch the rectification mode of the rectifier 21 by controlling the unidirectional conduction semiconductor transistor and/or the switch in the switchable capacitor unit 202 to be turned on or turned off. For example, the controller 701 is configured to control the switchable capacitor unit based on wireless charging running state information of the device 70, to switch the rectification mode of the rectifier 21.

In a possible implementation, if the wireless charging running state information includes a preset port voltage of the rectifier 21, the controller 701 is configured to control the switchable capacitor unit based on a preset voltage threshold and the preset port voltage, to switch the rectification mode of the rectifier 21. Optionally, the preset port voltage may include but is not limited to an input voltage of an input port of the rectifier 21 or an output voltage of an output port of the rectifier 21.

For example, if the preset port voltage is less than or equal to the preset voltage threshold, the controller 701 is configured to control the unidirectional conduction semiconductor transistor and/or the switch in the switchable capacitor unit 202 to be turned on or turned off, so that the rectifier 21 is in the voltage multiplier rectification mode, and the output voltage of the output port of the rectifier 21 can be greater than the input voltage of the input port of the rectifier 21. Therefore, it can be ensured that the device 70 can supply power to the cascade device.

For another example, if the preset port voltage is greater than the preset voltage threshold, the controller 701 is configured to control the unidirectional conduction semiconductor transistor and/or the switch in the switchable capacitor unit 202 to be turned on or turned off, so that the rectifier 21 is in the full-bridge rectification mode, and the output voltage of the output port of the rectifier 21 is almost equal to the input voltage of the input port of the rectifier 21.

In another possible implementation, if the wireless charging running state information includes a charging mode of the device 70, the controller 701 is configured to control the switchable capacitor unit based on the charging mode of the device 70, to switch the rectification mode of the conversion circuit 20. For example, if the charging mode of the device 70 may include but is not limited to an extended power profile (EPP) mode, a baseline power profile (BPP) mode, or a private fast charging mode, the controller 701 is configured to control the switchable capacitor unit based on the preset voltage threshold and the preset port voltage, to switch the rectification mode of the rectifier 21. Therefore, stability of an output voltage of the device 70 can be ensured.

For a specific manner, refer to related content in the foregoing possible implementations. Details are not described herein again. In conclusion, according to the device 70 provided in this embodiment of this application, the rectification mode of the rectifier 21 is switched, so that the output voltage of the device 70 can be adjusted, to meet a power supply requirement.

In another possible implementation, the wireless charging device in this embodiment of this application is configured to send a wireless charging signal. In this case, the wireless charging device is the wireless charging transmitter 1. The wireless charging transmitter 1 may include but is not limited to the inverter 11 and the resonant circuit 14.

For ease of understanding, based on the foregoing embodiments, in this embodiment of this application, an example in which the conversion circuit 20 shown in FIG. 2A is the inverter 11 and the resonant circuit 14 includes the transmit coil 13 and the resonant capacitor 12 is used to describe an implementation of the wireless charging device provided in this embodiment of this application.

Figure 7B:
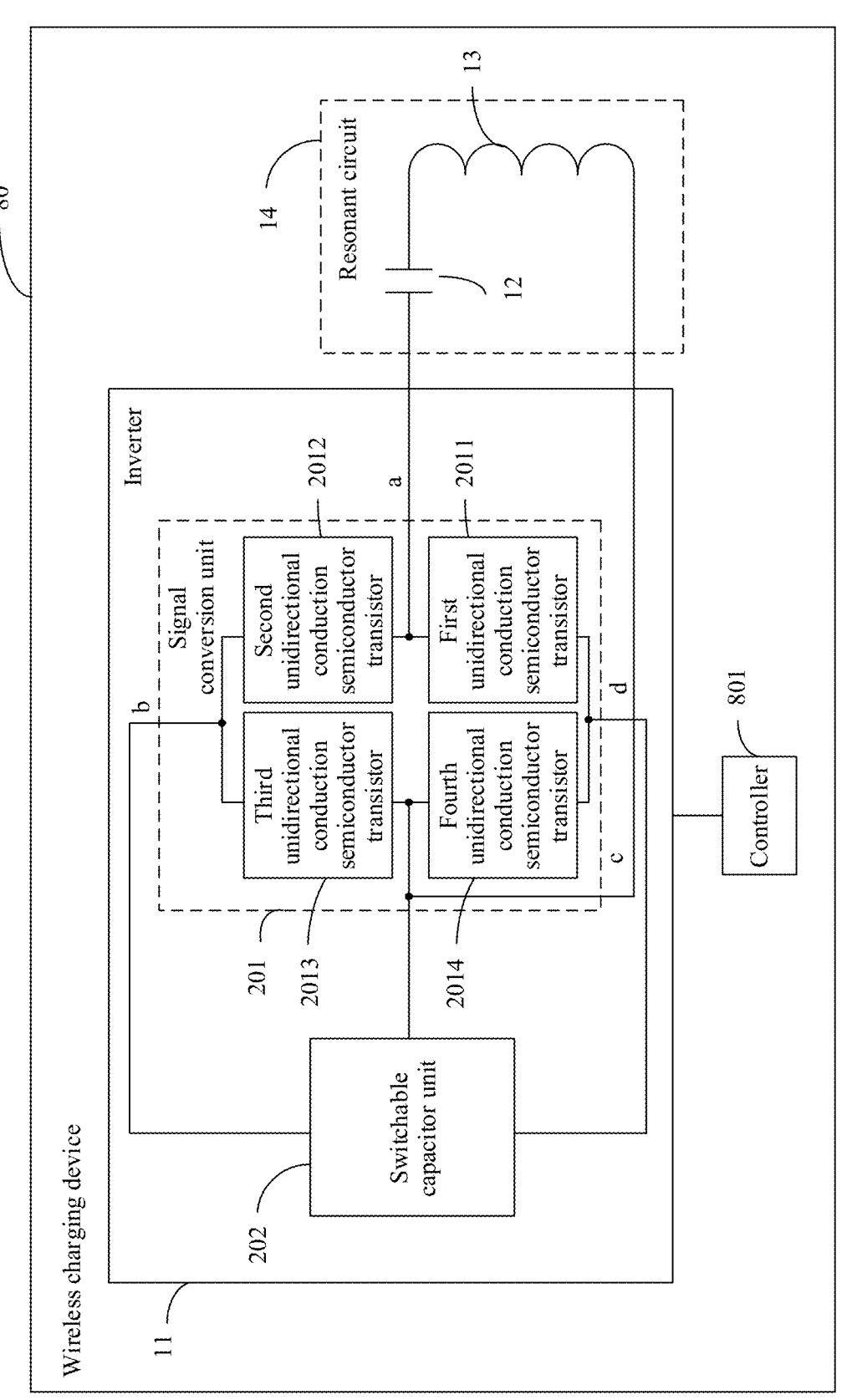
FIG. 7B is a schematic diagram of a structure of a wireless charging device according to an embodiment of this application.

FIG. 7B is a schematic diagram of a structure of a wireless charging device according to an embodiment of this application. As shown in FIG. 7B, a wireless charging device 80 provided in this embodiment of this application may include but is not limited to the resonant circuit 14, the inverter 11, and a controller 801. The controller 801 is coupled to the inverter 11, and is configured to control the signal conversion unit 201 and the switchable capacitor unit 202 in the inverter 11.

For example, the controller 801 may be connected to a gate of a unidirectional conduction semiconductor transistor in the signal conversion unit 201, and connected to a switch and a gate of a unidirectional conduction semiconductor transistor in the switchable capacitor unit 202. The second port b and the fourth port d of the inverter 11 are input ports of the inverter 11. The first port a and the third port c of the inverter 11 are used as output ports to be respectively coupled to two ports of the resonant circuit 14, so that the resonant circuit 14 converts, into an electromagnetic signal, an electrical signal output by the inverter 11, and transmits the electromagnetic signal.

In this embodiment of this application, the controller 801 is configured to control the switchable capacitor unit 202 in the inverter 11 to switch an inversion mode of the inverter 11. The inversion mode includes a voltage division inversion mode or a full-bridge inversion mode. It should be understood that the controller 801 is further configured to control each unidirectional conduction semiconductor transistor in the signal conversion unit 201 to be turned on or turned off. Specifically, the controller 801 switches the inversion mode of the inverter 11 by controlling the unidirectional conduction semiconductor transistor and/or the switch in the switchable capacitor unit 202 to be turned on or turned off. For example, the controller 801 is configured to control the switchable capacitor unit based on wireless charging running state information of the device 80, to switch the inversion mode of the inverter 11.

In a possible implementation, if the wireless charging running state information includes a preset port voltage of the inverter 11, the controller 801 is configured to control the switchable capacitor unit based on a preset voltage threshold and the preset port voltage, to switch the inversion mode of the inverter 11. Optionally, the preset port voltage may include but is not limited to an input voltage of an input port of the inverter 11 or an output voltage of an output port of the inverter 11.

For example, if the preset port voltage is greater than the preset voltage threshold, the controller 801 is configured to control the unidirectional conduction semiconductor transistor and/or the switch in the switchable capacitor unit 202 to be turned on or turned off, so that the inverter 11 is in the voltage division inversion mode, and the output voltage of the output port of the inverter 11 can be less than the input voltage of the input port of the inverter 11. Therefore, it can be ensured that a receive coil of a receive end can be coupled to a voltage meeting a preset coupled voltage range.

For another example, if the preset port voltage is not greater than the preset voltage threshold, the controller 801 is configured to control the unidirectional conduction semiconductor transistor and/or the switch in the switchable capacitor unit 202 to be turned on or turned off, so that the inverter 11 is in the full-bridge inversion mode, and the output voltage of the output port of the inverter 11 is almost equal to the input voltage of the input port of the inverter 11. Therefore, it can be ensured as much as possible that a receive coil of a receive end can be coupled to a voltage meeting a preset coupled voltage range.

Certainly, there may be another implementation in which the controller 801 controls the switchable capacitor unit based on wireless charging running state information of the device 80, to switch the inversion mode of the inverter 11. In conclusion, according to the device 80 provided in this embodiment of this application, the inversion mode of the inverter 11 is switched, so that an output voltage of the device 80 can be adjusted, to meet a required voltage coupled to the receive coil of the receive end.

The foregoing implementations and schematic diagrams of structures are merely examples of descriptions of the technical solutions of this application. A size ratio or the like does not constitute a limitation on the protection scope of the technical solutions, and any modification, equivalent replacement, or improvement made without departing from the spirit and principle of the foregoing implementations should fall within the protection scope of the technical solutions.

What is claimed is:

1. A rectifier, comprising:

a signal converter including a first port, a second port, a third port, a fourth port, a first unidirectional conduction semiconductor transistor, a second unidirectional conduction semiconductor transistor, a third unidirectional conduction semiconductor transistor, and a fourth unidirectional conduction semiconductor transistor, wherein an output port of the first unidirectional conduction semiconductor transistor and an input port of the second unidirectional conduction semiconductor transistor are coupled to the first port, an output port of the second unidirectional conduction semiconductor transistor and an output port of the third unidirectional conduction semiconductor transistor are coupled to the second port, an output port of the fourth unidirectional conduction semiconductor transistor and an input port of the third unidirectional conduction semiconductor transistor are coupled to the third port, an input port of the first unidirectional conduction semiconductor transistor and an input port of the fourth unidirectional conduction semiconductor transistor are coupled to the fourth port, the first port and the third port are configured to be coupled to a resonant circuit, and the fourth port is configured to be coupled to a constant voltage;

wherein the first port and the third port are input ports of the rectifier, and the second port and the fourth port are output ports of the rectifier;

a first switch is coupled between the third port and an internal node, and a first capacitor and a second capacitor are coupled to the second port, the fourth port, and the internal node;

wherein the first capacitor is coupled between the internal node and the second port, and the second capacitor is coupled between the internal node and the fourth port; and a third capacitor is coupled between the second port and the fourth port.

2. The rectifier according to claim 1, wherein the first capacitor is coupled between the internal node and a preset position, and the second capacitor is coupled between the second port and the fourth port.

3. The rectifier according to claim 1, wherein the first switch is coupled between the internal node and a preset position, and the second capacitor is coupled between the second port and the fourth port.

4. The rectifier according to claim 3, wherein the preset position comprises any one of the second port, the fourth port, or a preset voltage source.

5. The rectifier according to claim 1, further comprising a first switching unit coupled between the internal node and the first port, and a second switching unit coupled between the fourth port and the resonant circuit.

6. The rectifier of claim 1, wherein each unidirectional conduction semiconductor transistor is a diode, an input port of the diode is an anode, and an output port of the diode is a cathode.

7. The rectifier of claim 1, wherein each unidirectional conduction semiconductor transistor is a metal-oxide semiconductor (MOS) transistor, and a gate of the MOS transistor receives a control signal to prevent a current from passing an output port of the MOS transistor.

8. The rectifier according to claim 1, further comprising an assisted boost circuit coupled between the first port and the second port, and configured to perform a voltage boost on a voltage of the first port.

9. An inverter, comprising:

a signal converter including a first port, a second port, a third port, a fourth port, a first unidirectional conduction semiconductor transistor, a second unidirectional conduction semiconductor transistor, a third unidirectional conduction semiconductor transistor, and a fourth unidirectional conduction semiconductor transistor, wherein an input port of the first unidirectional conduction semiconductor transistor and an output port of the second unidirectional conduction semiconductor transistor are coupled to the first port, an input port of the second unidirectional conduction semiconductor transistor and an input port of the third unidirectional conduction semiconductor transistor are coupled to the second port, an input port of the fourth unidirectional conduction semiconductor transistor and an output port of the third unidirectional conduction semiconductor transistor are coupled to the third port, an output port of the first unidirectional conduction semiconductor transistor and an output port of the fourth unidirectional conduction semiconductor transistor are coupled to the fourth port, the first port and the third port are configured to be coupled to a resonant circuit, and the fourth port is configured to be coupled to a constant voltage;

wherein the first port and the third port are output ports of the inverter, and the second port and the fourth port are input ports of the inverter;

a first switch is coupled between the third port and an internal node, and a first capacitor and a second capacitor are coupled to the second port, the fourth port, and the internal node;

wherein the first capacitor is coupled between the internal node and the second port, and the second capacitor is coupled between the internal node and the fourth port; and a third capacitor is coupled between the second port and the fourth port.

10. The inverter according to claim 9, wherein the first capacitor is coupled between the internal node and a preset position, and the second capacitor is coupled between the second port and the fourth port.

11. The inverter according to claim 9, wherein the first switch is coupled between the internal node and a preset position, and the second capacitor is coupled between the second port and the fourth port.

12. The inverter according to claim 11, wherein the preset position comprises any one of the second port, the fourth port, or a preset voltage source.

13. The inverter according to claim 9, further comprising a first switching unit coupled between the internal node and the first port, and a second switching unit coupled between the fourth port and the resonant circuit.

14. The inverter of claim 9, wherein each unidirectional conduction semiconductor transistor is a metal-oxide semiconductor (MOS) transistor, and a gate of the MOS transistor receives a control signal to prevent a current from passing an output port of the MOS transistor.

15. A wireless charging device, wherein the device is configured to receive a wireless charging signal, and the device comprises a rectifier and a resonant circuit; wherein the rectifier comprises: a signal converter including a first port, a second port, a third port, a fourth port, a first unidirectional conduction semiconductor transistor, a second unidirectional conduction semiconductor transistor, a third unidirectional conduction semiconductor transistor, and a fourth unidirectional conduction semiconductor transistor, wherein an output port of the first unidirectional conduction semiconductor transistor and an input port of the second unidirectional conduction semiconductor transistor are coupled to the first port, an output port of the second unidirectional conduction semiconductor transistor and an output port of the third unidirectional conduction semiconductor transistor are coupled to the second port, an output port of the fourth unidirectional conduction semiconductor transistor and an input port of the third unidirectional conduction semiconductor transistor are coupled to the third port, an input port of the first unidirectional conduction semiconductor transistor and an input port of the fourth unidirectional conduction semiconductor transistor are coupled to the fourth port, the first port and the third port are configured to be coupled to a resonant circuit, and the fourth port is configured to be coupled to a constant voltage; wherein the first port and the third port are input ports of the rectifier, and the second port and the fourth port are output ports of the rectifier; a first switch coupled between the third port and an internal node, and a first capacitor and a second capacitor coupled to the second port, the fourth port, and the internal node; wherein the first capacitor is coupled between the internal node and the second port, and the second capacitor is coupled between the internal node and the fourth port; and a third capacitor coupled between the second port and the fourth port.

16. The wireless charging device of claim 15, wherein the first capacitor is coupled between the internal node and a preset position, and the second capacitor is coupled between the second port and the fourth port.

17. The wireless charging device of claim 15, wherein the first switch is coupled between the internal node and a preset position, and the second capacitor is coupled between the second port and the fourth port.

18. The wireless charging device of claim 15, further comprising a first switching unit coupled between the internal node and the first port, and a second switching unit coupled between the fourth port and the resonant circuit.

19. The wireless charging device of claim 15, wherein the device further comprises a controller, configured to control a switchable capacitor unit to switch a rectification mode of the rectifier; and the rectification mode comprises a voltage multiplier rectification mode or a full-bridge rectification mode.

20. The wireless charging device of claim 15, further comprising a charging management unit that is coupled between a second port and a fourth port and that is configured to perform voltage conversion on an output voltage of an output port of the rectifier, to match a storage voltage of a battery.

\* \* \* \* \*